United States Patent [19]
Kvisteröy et al.

[11] Patent Number: 5,834,646
[45] Date of Patent: Nov. 10, 1998

[54] FORCE SENSOR DEVICE

[75] Inventors: Terje Kvisteröy; Henrik Jakobsen, both of Horten, Norway

[73] Assignee: SensoNor asa, Horten, Norway

[21] Appl. No.: 848,301

[22] Filed: Apr. 28, 1997

Related U.S. Application Data

[63] Continuation-in-part of Ser. No. 592,844, Jan. 22, 1996, abandoned, and Ser. No. 421,673, Apr. 12, 1995, abandoned.

[51] Int. Cl.$^6$ ........................................................ G01P 15/10
[52] U.S. Cl. ..................................... 73/514.29; 73/862.59; 73/DIG. 1; 280/735
[58] Field of Search ........................... 73/514.29, 514.15, 73/704, 862.59, 702, 24.05, 24.06, DIG. 1; 280/735

[56] References Cited

U.S. PATENT DOCUMENTS

| | | | |
|---|---|---|---|
| 4,567,441 | 1/1986 | Greenwood | 73/862.59 |
| 4,945,773 | 8/1990 | Sickafus | 73/514.29 |
| 5,090,254 | 2/1992 | Guckel et al. | 73/514.29 |

*Primary Examiner*—John E. Chapman
*Attorney, Agent, or Firm*—Rodman & Rodman

[57] ABSTRACT

A force sensor device for sensing seismic force due to changes in acceleration or pressure, comprising mass-spring system formed by a resonant flexible plate forming system mass and suspended from a rigid frame by means of at least two beams forming system springs and located at different sides of the plate, the plate, frame and beams being made of a silicon. A vibration excitation device upon application of electric signals at an elected one of a plurality of specific frequencies interacts with the plate to create a corresponding specific vibration mode therein, and a detection device detects any vibration frequency change in the plate due to interaction between a stress field thereon caused by the seismic force and a stress field thereon caused by the vibration mode.

41 Claims, 16 Drawing Sheets

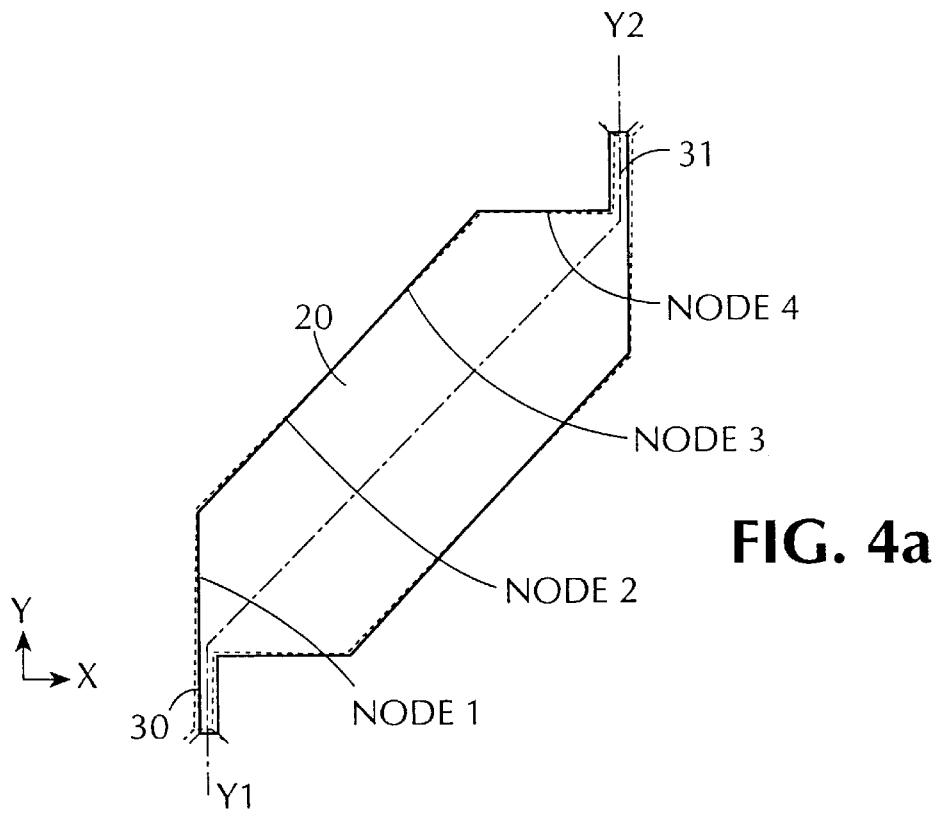
FIG. 4a
FIG. 4b
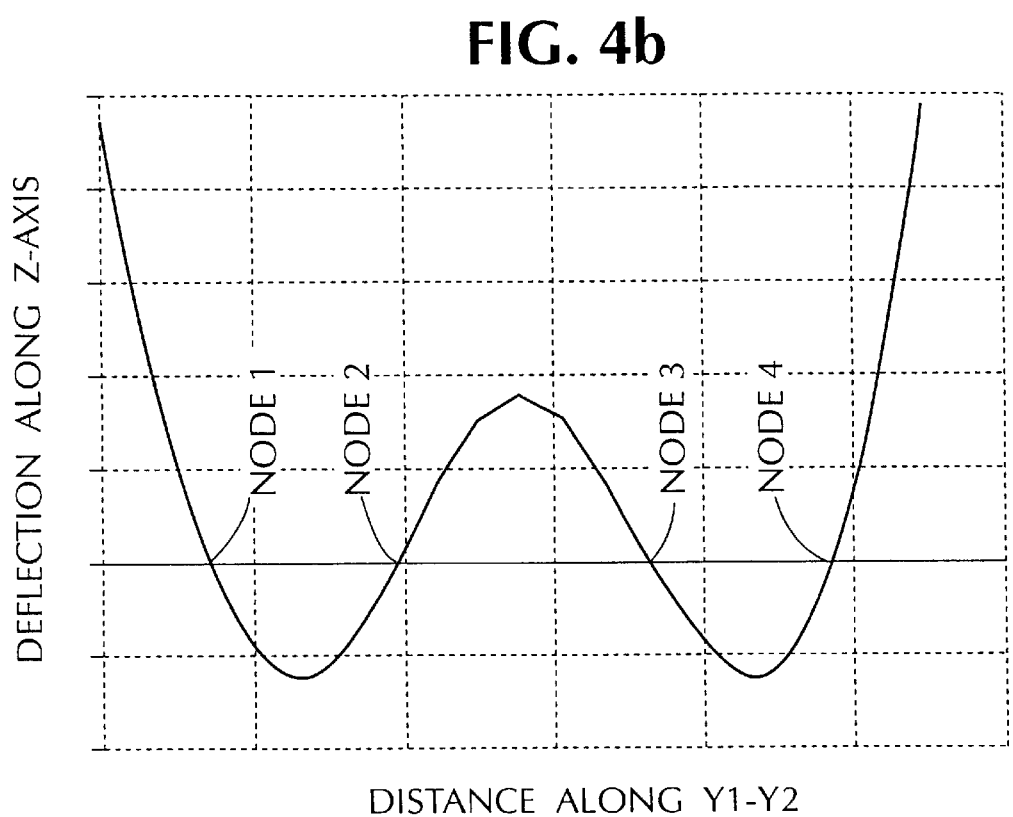

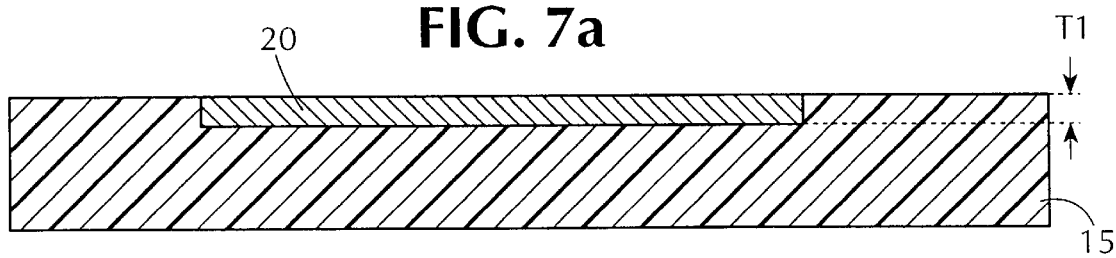
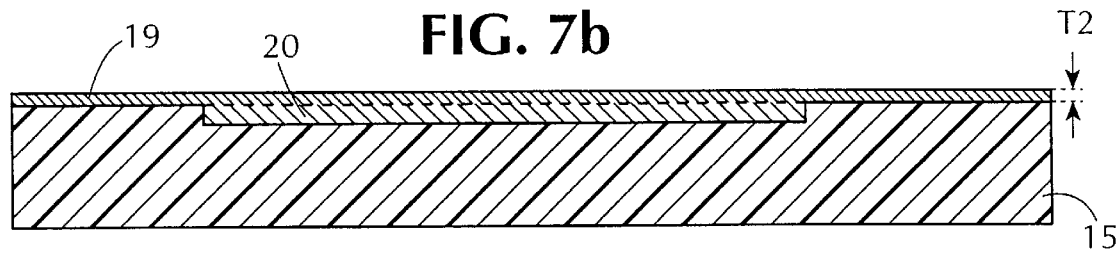
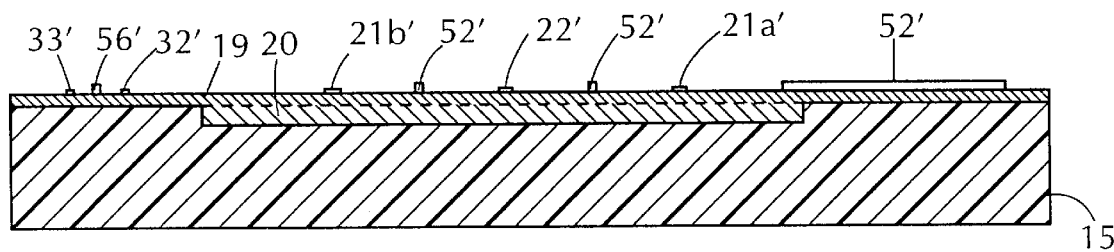
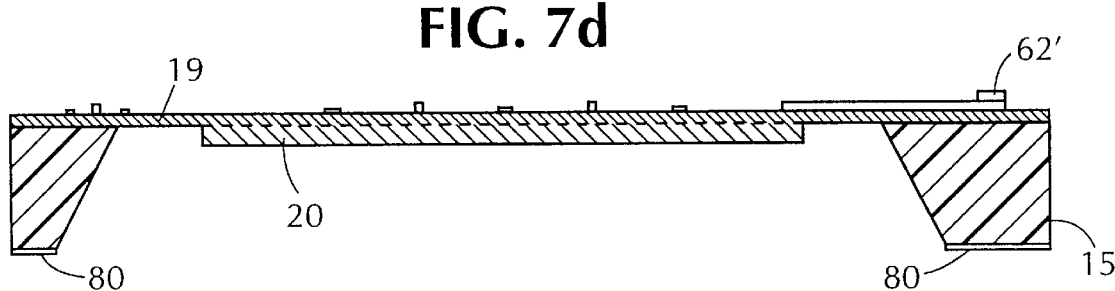
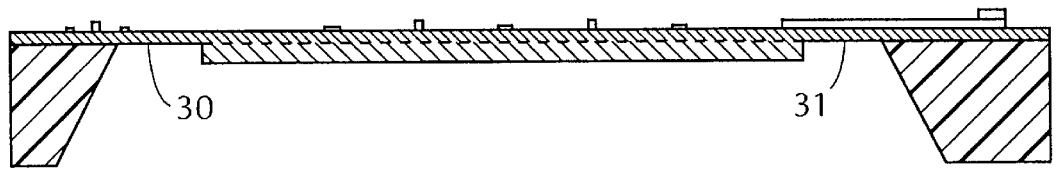

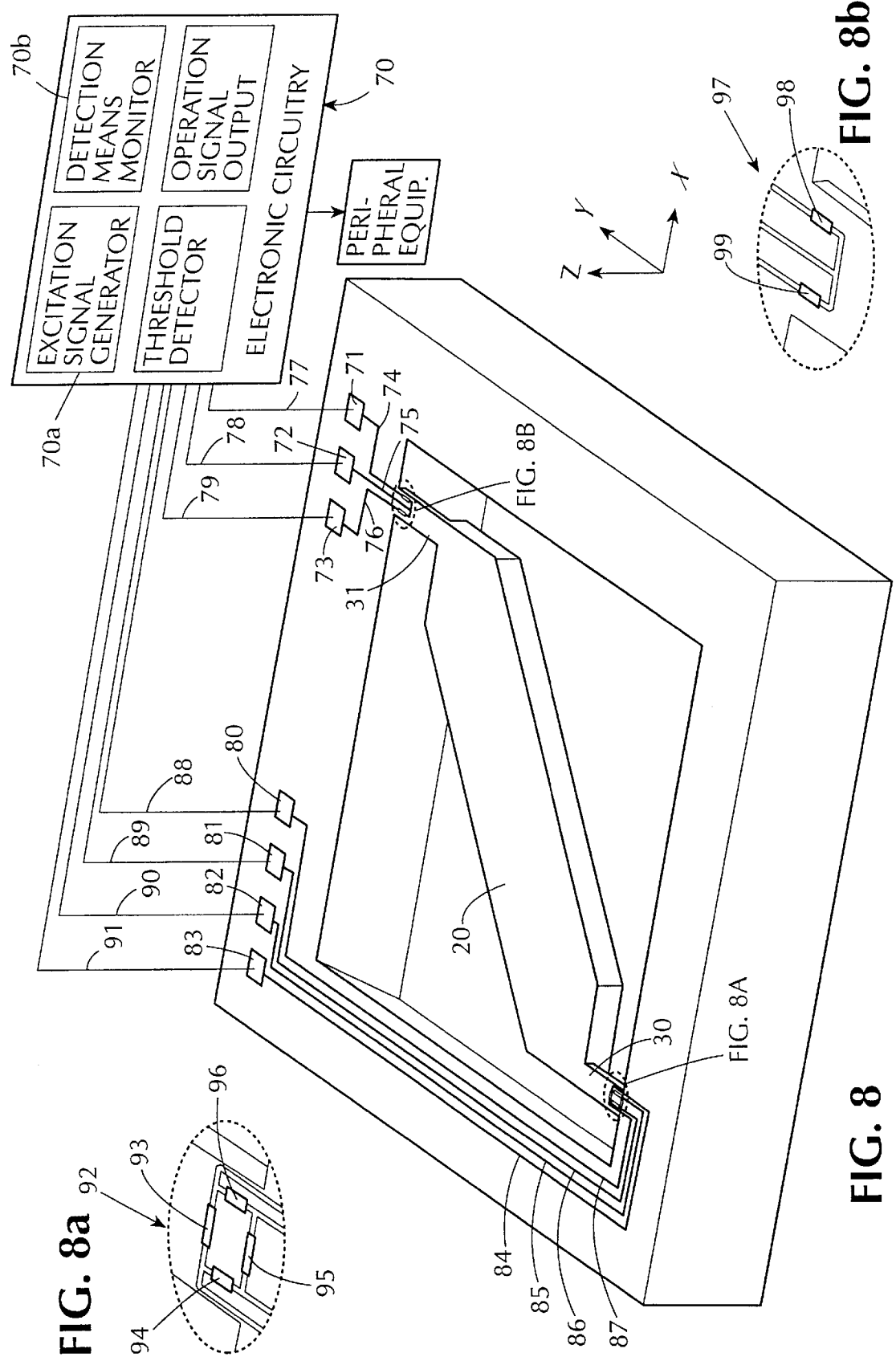

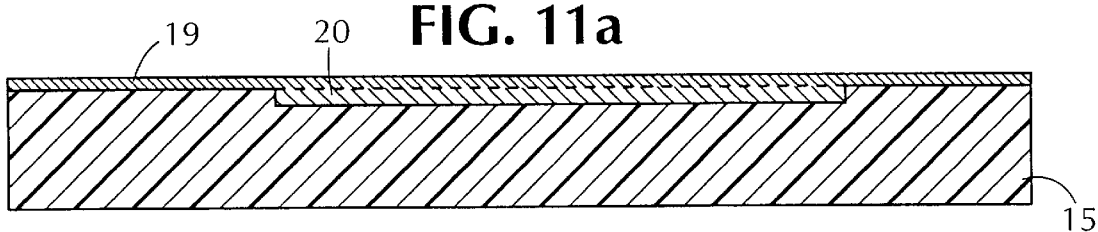
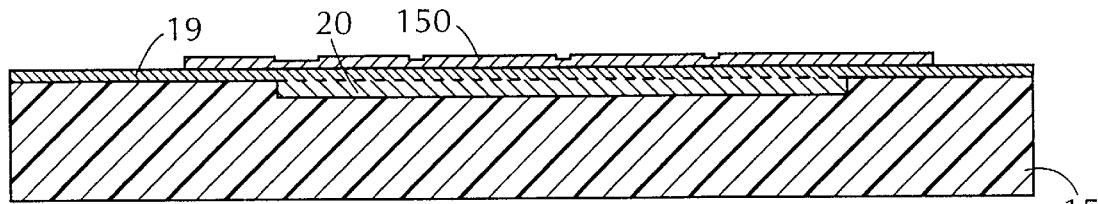
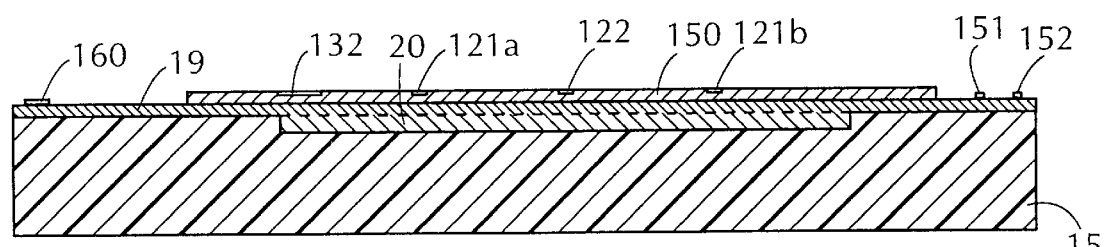
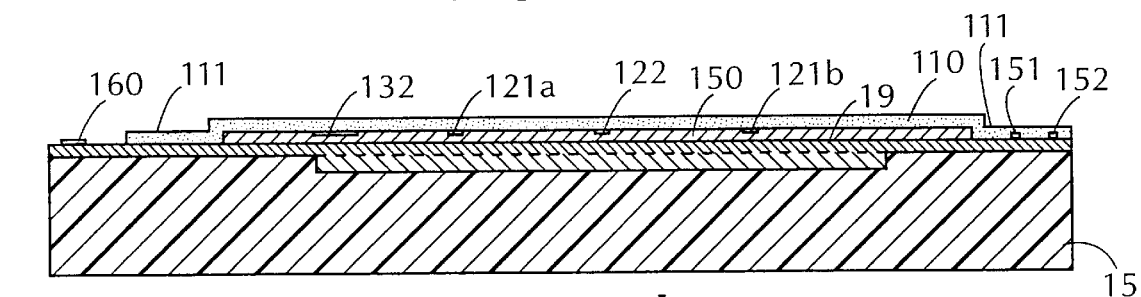
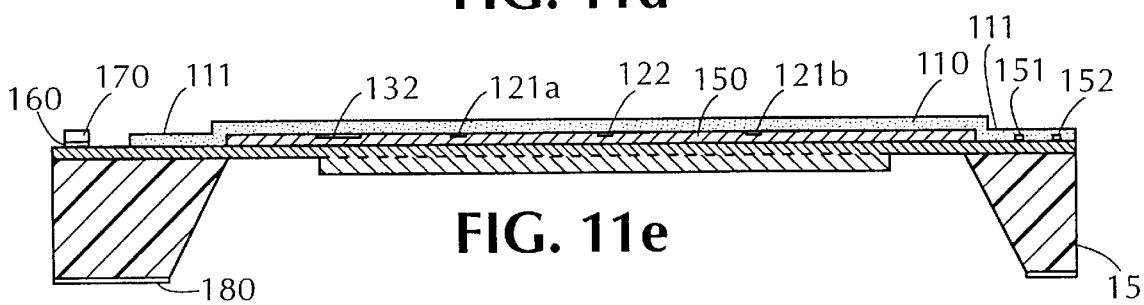
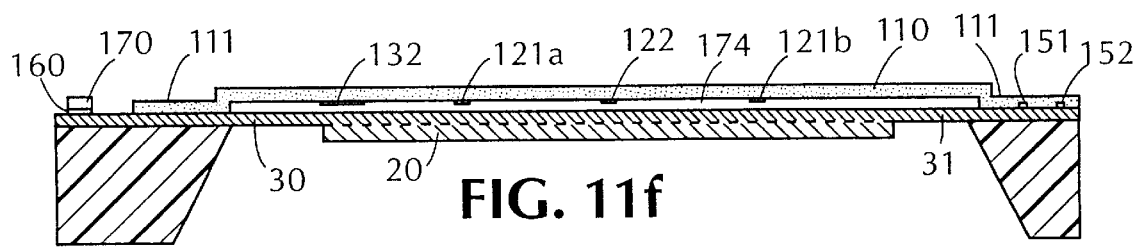

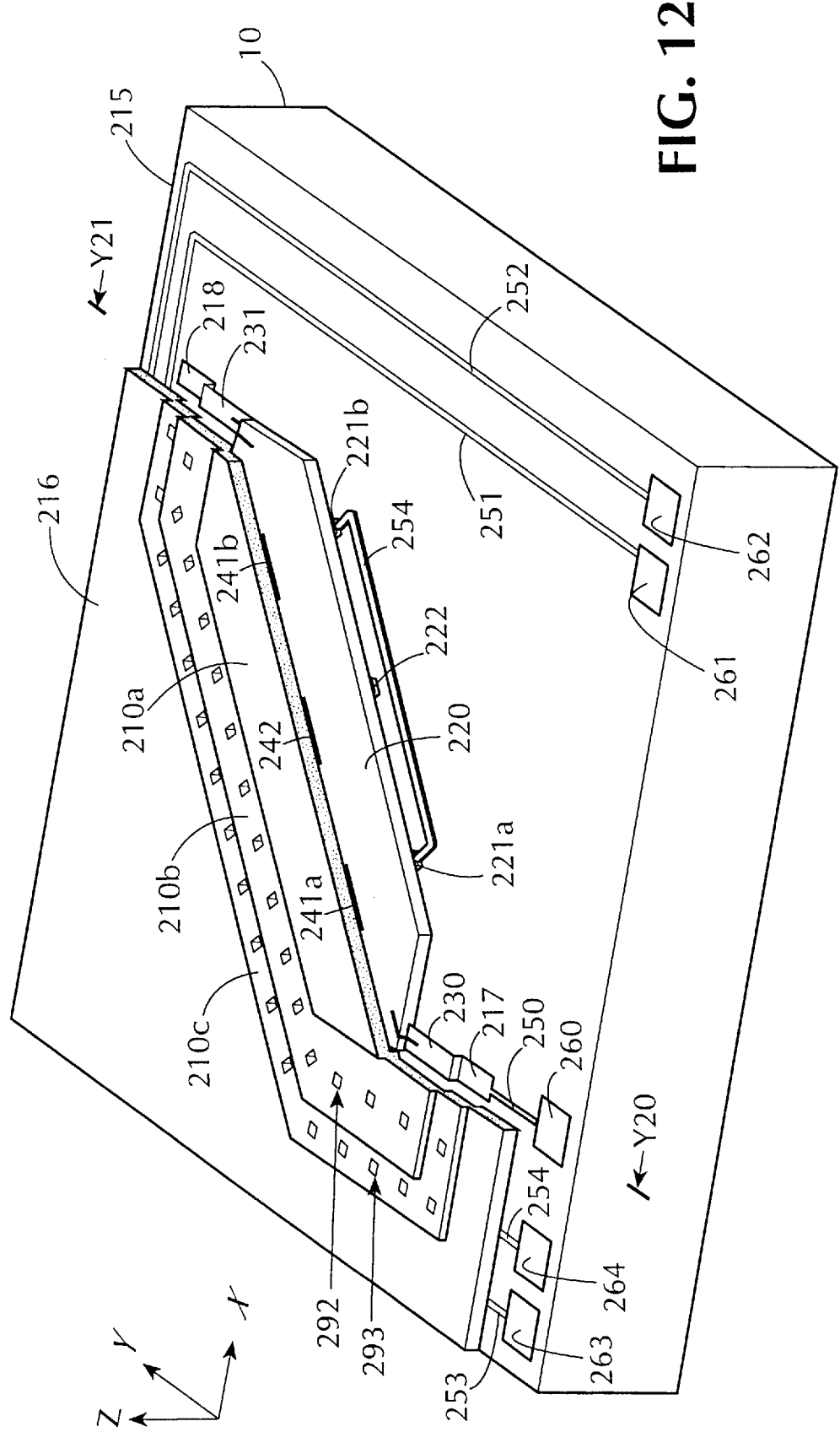

FORCE SENSOR DEVICE

This application is a continuation-in-part of Ser. Nos. 08/592,844, filed Jan. 22, 1996, abandoned, and 08/421,673, filed Apr. 12, 1995, abandoned.

This invention relates to force sensitive resonant structure made of silicon for the measurement of forces, such as acceleration forces and fluid pressure forces caused by movement of liquids or gases. The influence of force is converted into a change in the resonance frequency of one of the resonance modes for a mass-spring system by using a new design principle whereby resonant vibrations are set up in the complete force sensitive mass-spring system. An important field of application for such force sensors is accelerometers for automotive safety systems that can be fabricated by well known silicon micromechanics fabrication methods.

Force sensors such as microaccelerometers built from silicon material have received a great deal of attention over the past few years, mainly due to a fast increasing market penetration into automotive applications such as crash sensors for safety systems like air-bag and seat-belt tensioners, acceleration measurement devices for new generations of anti-lock breaking systems (ABS) and active suspension systems. A review of low cost accelerometers is given by G. A. MacDonald: "A Review of Low Cost Accelerometers for Vehicle Dynamics"; Sensors and Actuators, A21–A23 (1990), 303–307. The prior art of silicon microaccelerometers cover capacitive types such as described in U.S. Pat. No. 4,679,456 and piezoresistive types such as described in DE 3814952.

Generally, in a typical accelerometer, a mass is suspended to one cantilever spring or to two or more springs attached to opposite sides of the mass. The mass is maintained in a neutral position as long as the system is at rest or in a motion of constant velocity. When the system undergoes a change in velocity, the spring mounted mass will at first resist the movement because of its inertia and set up additional force in the springs. When the acceleration is in a direction perpendicular to the plane of the springs, the inertia created force of the proof mass will cause bending of the springs. Capacitive accelerometers are designed to detect deflection of the mass. In piezoresistive accelerometers, stress sensitive resistors are built on the surface of the springs.

Resonant sensors are attractive for precision measurements, because the frequency of a mechanical resonant structure can be made highly sensitive to mechanical signal inputs such as acceleration, force and flow. Microaccelerometers having resonant micro bridges are known. This principle is very attractive when built in single crystal silicon since the temperature coefficient related to sensitivity will mainly be caused by the drift in the elastic properties of silicon. Around room temperature the stiffness decreases with increasing temperature with less than 100 ppm/degC. Designs that can be built into silicon are also very attractive due to the low-cost batch processing of silicon wafers. A high Q-factor is needed for the vibration mode being used to obtain good resolution in the detected frequency signal.

Prior art inventions in this field of technology are described in P.C.T/US92/00895 (R. Hulsing, Sundstrand), U.S. Pat. No. 4,945,773 (E. N. Sickafus, Ford), U.S. Pat. No. 4,805,456 (R. T. Howe et. al.), U.S. Pat. No. 4,893,509 (MacIver et al, G. M). The first two mentioned references disclose a separate vibrating resonating structure coupled to the seismic mass-spring system mechanically (Hulsing) or via electrostatic force (Sickafus). In the other references, there are disclosed vibration modes set up in one or more springs holding a stiff proof mass (D. J. Miles et. al.) or built on top of and added to a spring element or a pressure sensitive diaphragm (H. Guckel et. al.). The excitation of the vibration modes are by electrostatic force (Howe et al. and MacIver et al.) and detection by sensing of changes in capacitance or resistive thermal excitation and piezoresistive pick-up (D. J. Miles et. al. and H. Guckel et. al.). The inventions described by Hulsing and Sickafus make use of a separate vibrating resonating structure coupled to the seismic mass-spring system mechanically (Hulsing), or via electrostatic force (Sickafus), the seismic mass being stiff in all cases. These inventions differ much in their nature from the present invention due to the fact that their resonating structures are either set up in structures separated from a rigid proof mass or set up in one or more of the springs interconnected to a rigid proff mass.

The inventors of the present invention have recognized the following disadvantages and limitations of the prior art:

(a) Since the prior art seismic system is not continuously moving, the structures do not include inherent self-tests.

(b) The use of two separate mass-spring systems, one for the seismic system and one for the resonating element, makes processing more complex, thereby adding to the production cost.

(c) A more complex design will result in a larger number of possible catastrophic failure modes during production of the device and during the product life-time.

Setting up vibrations in the springs of the seismic mass-spring system as shown by Howe et al. and by MacIver et al. represent a further step in microsensor integration compared to Hulsing and Sickafus. The embodiment of McIver et al. as shown in FIG. 1 of U.S. Pat. No. 4,893,509 consists of a stiff central proof mass of silicon and gold supported by four identical silicon springs on each side of the four-sided mass. The springs are anchored to a silicon substrate. The disclosed embodiments are designed for excitation by electrostatic force and detection by capacitance change. The embodiments are further based on the principle that the resonance frequency increases in beams under increased tension and decreases in the beam under compression when acceleration forces act on the springs in the plane of the springs. Change in the difference between these two resonance frequencies is the measure of acceleration.

The present inventors have however recognized the following disadvantages and important limitations of the latter prior art:

(a) In order to make the embodiment on a small silicon chip to obtain low cost manufacturing the capacitors used for detection will have to be very small in size and capacitance value since both excitation and detection must be done on the spring elements. This makes the prior art embodiment sensitive to parasitic signals from other parts of the electronic circuitry through stray capacitances and sensitive to noise sources.

(b) In addition, electrostatic excitation/detection relies on strict control of small air gaps. Particle contamination is a problem of great concern in processing of such devices, in particular during dicing and packaging. Stitching of the flexible parts to the opposite surface is a problem that may happen during etching of sacrificial layers and in heavy overload situations after release of the micromechanical structures. This may happen in the later production steps hereby turning out as yield problems or even lead to catastrophic failures during transport and handling and hereby causing problems for customer and end-user.

(c) A third limitation in the prior art embodiment is related to using the fundamental frequency mode (half-wave) of a linear spring which has a relatively low Q-factor in the range 50 to 200 at atmospheric pressure due to the relatively large deflections for this fundamental frequency mode. Reduced pressure is necessary to obtain the high Q-factor needed for solution with high dynamic range and high resolution. A design goal for a robust ±2 g accelerometer for ABS or suspension and ±50 g for air-bag is high resistance is to the mechanical shocks that may happen during handling usually tested by a 1.2 m drop-test. Possibilities for leaks are an important quality concern if the product must be kept at low pressure over a life-time in the range of 10 to 20 years.

(d) A further limitation of this prior art embodiment is related to self-test. Since only the springs which support the proof mass are set into vibrations and the proof mass is not continuously moving, the prior art does not involve a direct test of the consistency of the proof mass itself and the two other springs. The prior art solutions consist of several individual spring-mass systems. The resonant vibration of the springs are controlled by the stiffness of the spring and the mass of the spring and not the proof-mass.

(e) In addition to this the realization of a sensor based on several separate vibrating systems may cause cross-talk between the different resonance frequencies due to mechanical and/or electrical coupling, which in some cases may ultimately end in mode jumping, an abrupt jump between two lightly damped modes within the same frequency window.

It is an object of the present invention to provide resonant micro force sensors such as accelerometers that are robust, durable and can be manufactured at low cost in order to meet automotive production requirements. It is a further object to provide embodiments that inherently have self-test features to provide reliable operation in a safety system such as airbag deployment systems by presenting a general geometrical design where the resonant structure is in itself the seismic mass-spring system. This is accomplished by using an inertial mass formed as a resonant plate.

It is a further object of the present invention to provide for designing and fabricating of force sensors according to the invention for measuring forces set up by fluids, e.g. air or gases, in motion.

In accordance with the preferred embodiments of this invention, these and other objects and advantages are accomplished as described in the following.

The inventive features of the invention include the enforcing of a resonant vibrational mode in an entire force sensitive mass-spring system by using a thin and flexible plate formed mass. A higher order resonant mode is set up in the plate type mass-spring system, the supporting beams being thin and flexible enough to follow the resonant mode of the plate in such a way that the complete seismic mass-spring system is excited into an "integrated" movement. The beams act as hinges or springs permitting movement of the plate formed mass with respect to the support. The vibration mode can be sustained and detected by different means. Efficient means to set up and sustain the vibrations are the use of thermal resistors on the flexible plate formed mass and/or the beams and/or by using nearby electrodes to set up electrostatic forces on the plate and/or the beams. Efficient means to detect the resonant movement are to place piezoresistors on high stress areas on the beams and/or on the plate or nearby capacitance electrodes located on areas of large deflection caused by vibrational movements. Forces in the z-direction acting on the plate formed mass gives rise to changes in the stress field of both the beams and the flexible plate type mass, thereby making a detectable change in the resonance frequency of the vibrating plate type mass. The excitation means and the detection means form parts of a closed-loop electrical circuit. The force sensor will act as an accelerometer when the inertia of the plate type mass is coupled with an acceleration of the support in the z-direction. The force sensor will act as a flow sensor when the force from a flow of gas or liquid is acting on the plate mass in the z-direction.

The characteristic features of the present invention are defined in the attached patent claims. Further, preferred, non-limitative embodiments of the invention are described below with reference to the attached drawing figures.

In the drawings:

FIG. 1 shows a 3-dimensional view of one geometric shape according to the present invention with an oblong plate type mass-spring system supported on a thick frame;

FIG. 2 elucidates the critical dimensions that are most important for the force sensitivity of the embodiment of FIG. 1;

FIG. 4a shows movement and nodes of an acceleration sensitive resonant mode 9 for the example in FIG. 1 and FIG. 4b illustrates the shape of the movement of the centerline of the plate and beams for this same resonant mode;

Figure 5:
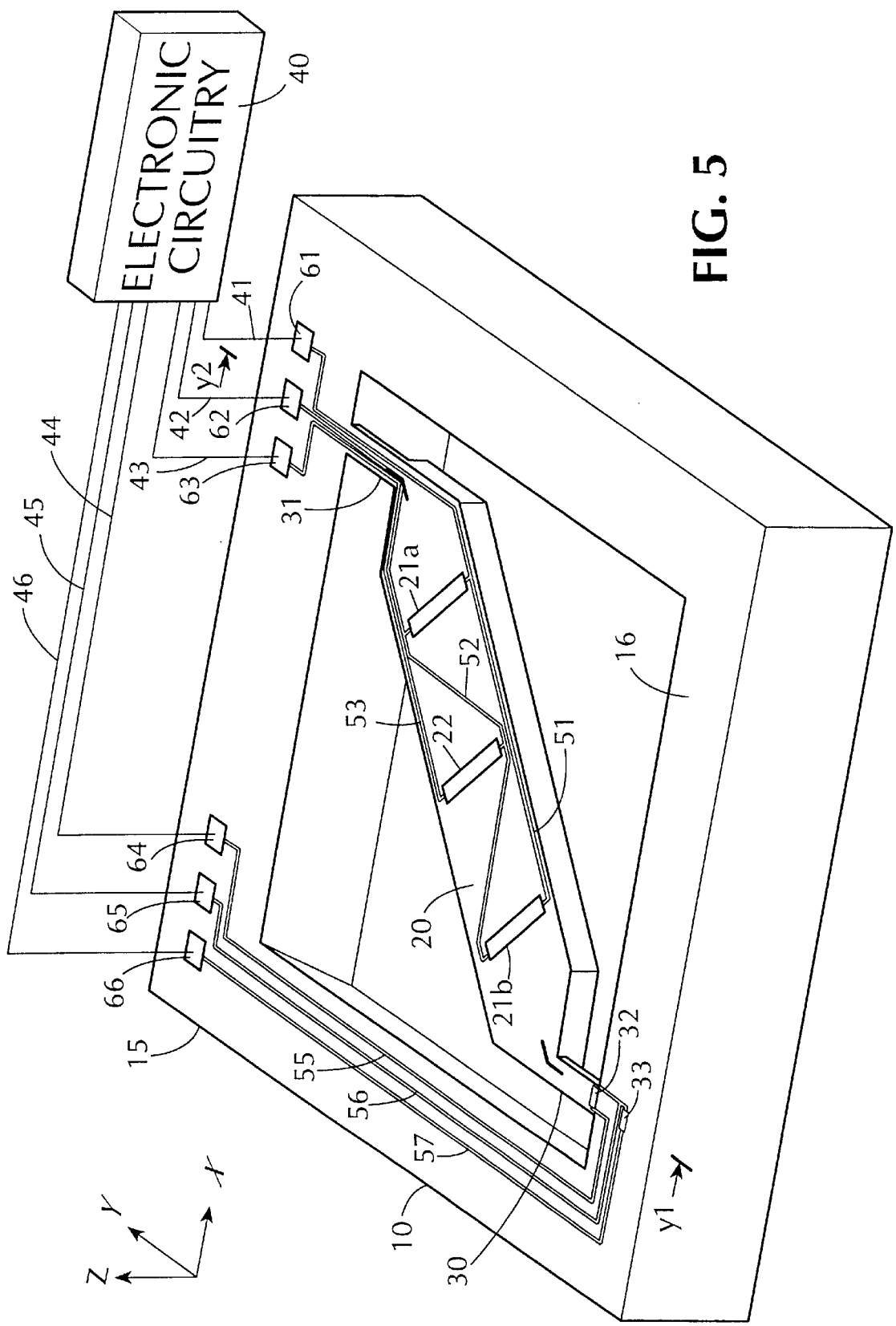
FIG. 5 is a high-level block diagram of a more detailed first example of the embodiment of FIG. 1 showing an accelerometer based on thermal resistive excitation by placing three thermal resistors on the plate for excitation of the resonant mode 9 as given in FIG. 4 and with one piezoresistive pick-up resistor placed on one of the beams.

FIGS. 6a–e show the main process steps of one method to build the structure of FIG. 5 by using diffused resistors and a combination of bulk micromachining and release of the plate and the beams by dry etching;

FIGS. 7a–e show the main process steps of a modified method to build the structure of FIG. 5 by using thin-film resistors.

Figure 1:
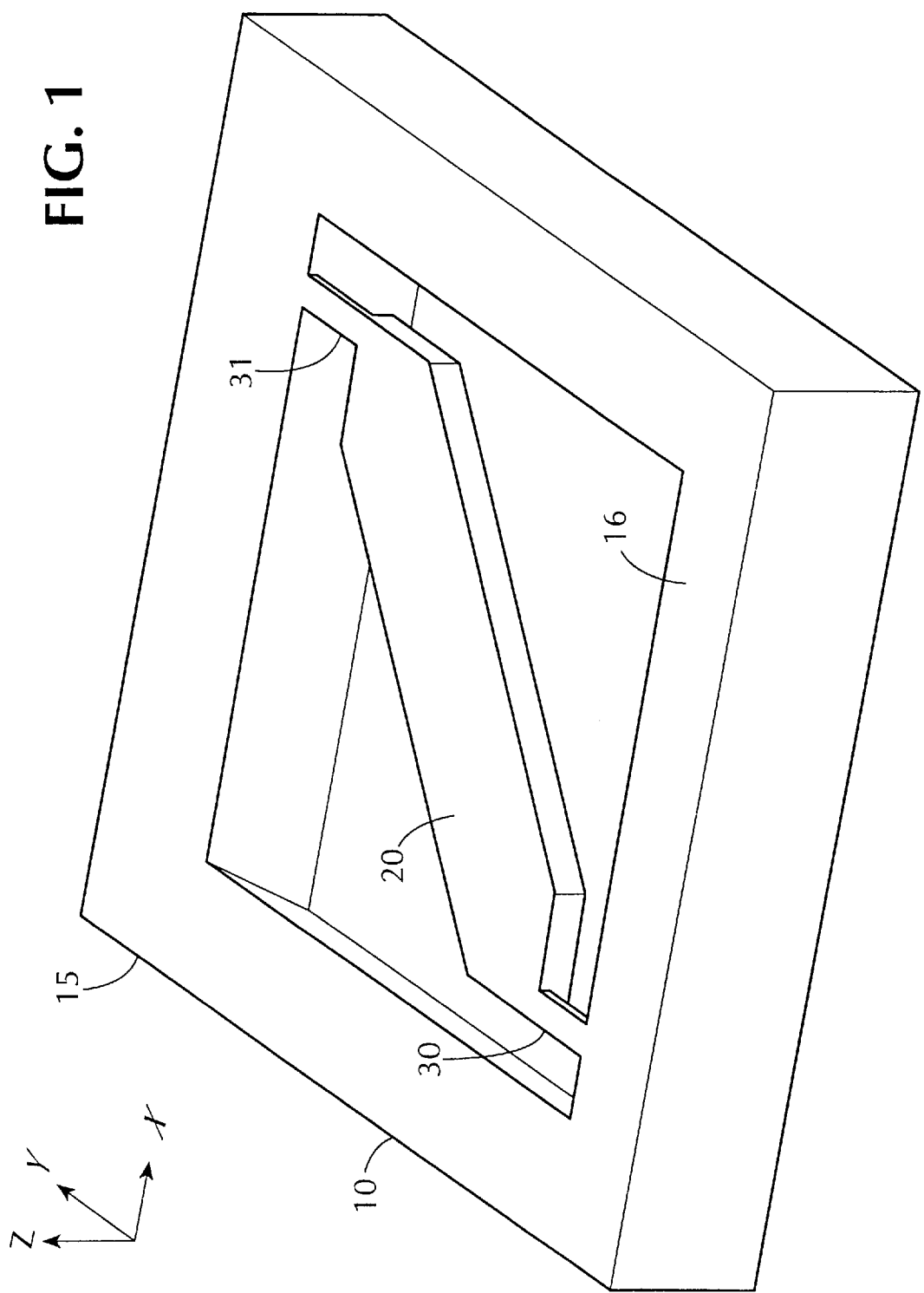

FIG. 8 shows as an example a second detailed embodiment of the invention using two excitation resistors on one of the beams and a full piezoresistive Wheatstone bridge as detection principle on the other beam for the example of FIG. 1.

Figure 9:
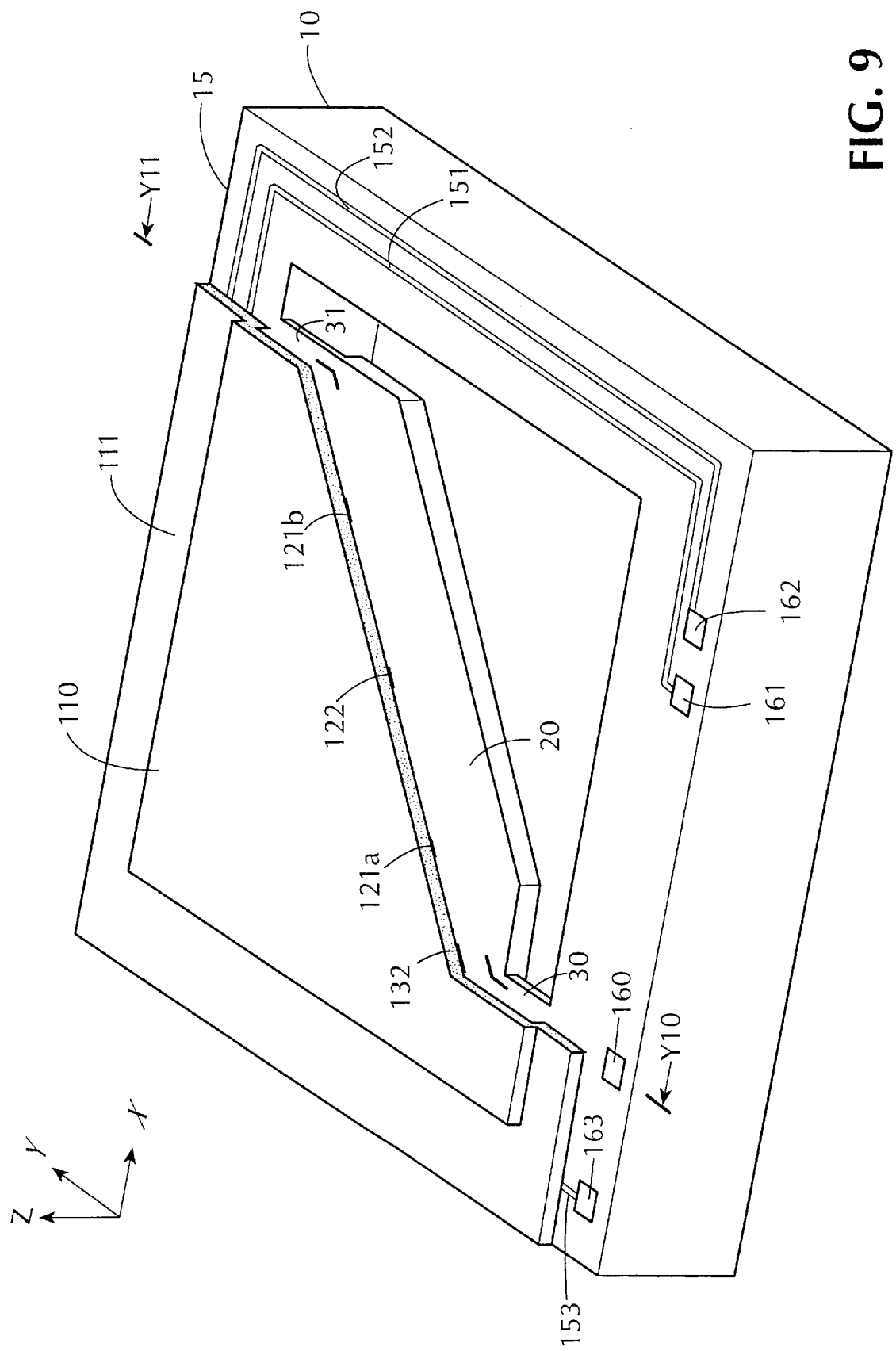
Figure 10:
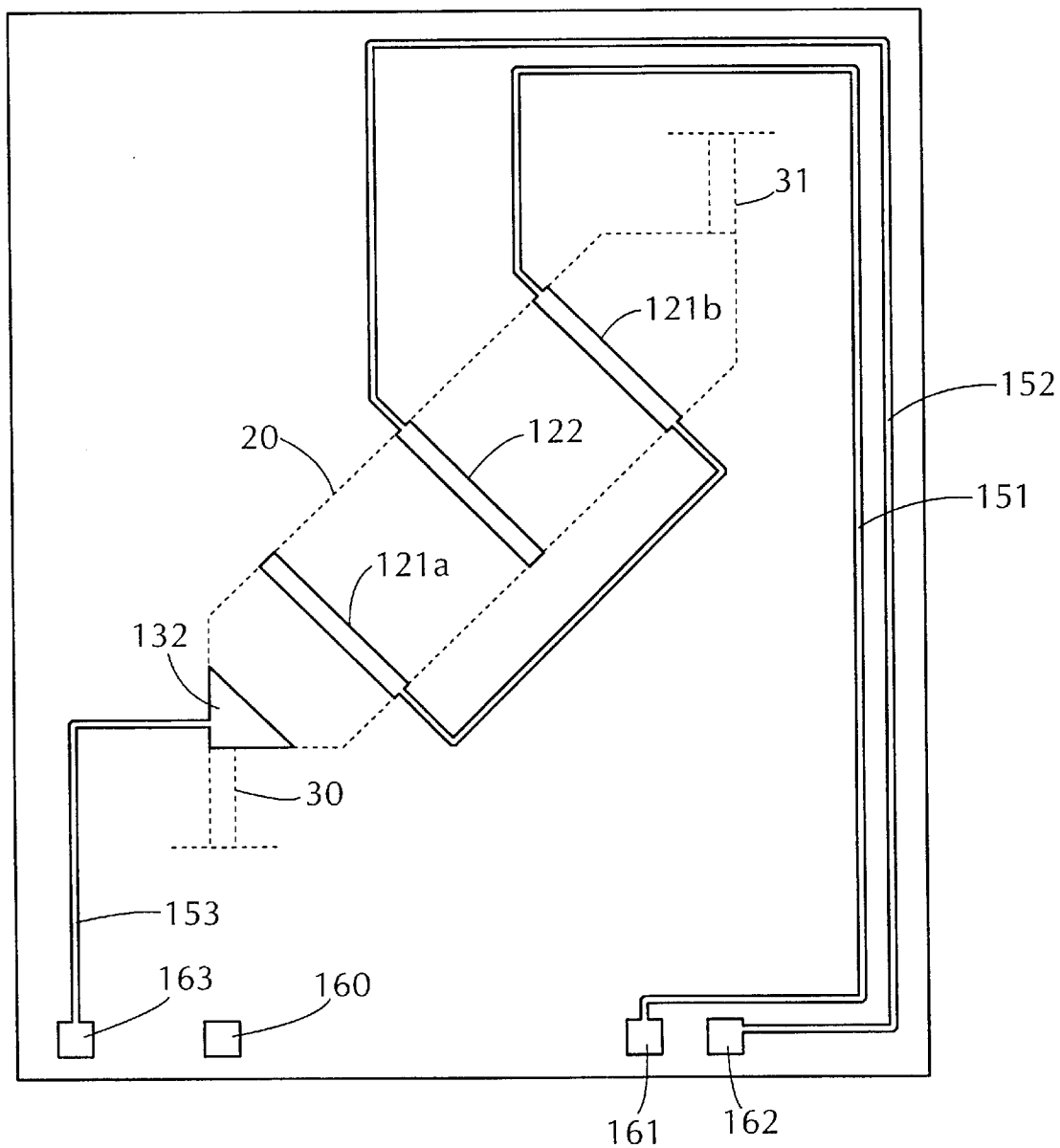

FIG. 9 shows as an example a third detailed realisation of the same embodiment of this invention comprising the resonating plate in single crystal silicon and using capacitive sensing and electrostatic force for excitation by placing plate-electrodes on an insulating polysilicon plate located over and in close vicinity to the resonating structure;

FIG. 10 shows the electrode system and chip interconnection for the embodiment of FIG. 9.

Figure 13B:
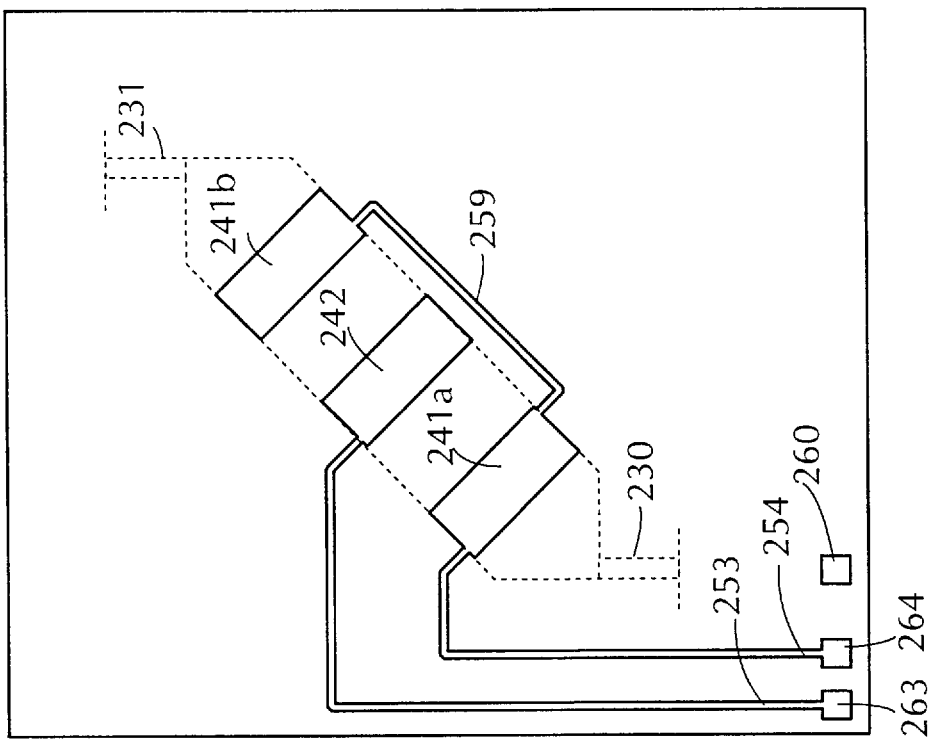
Figure 13A:
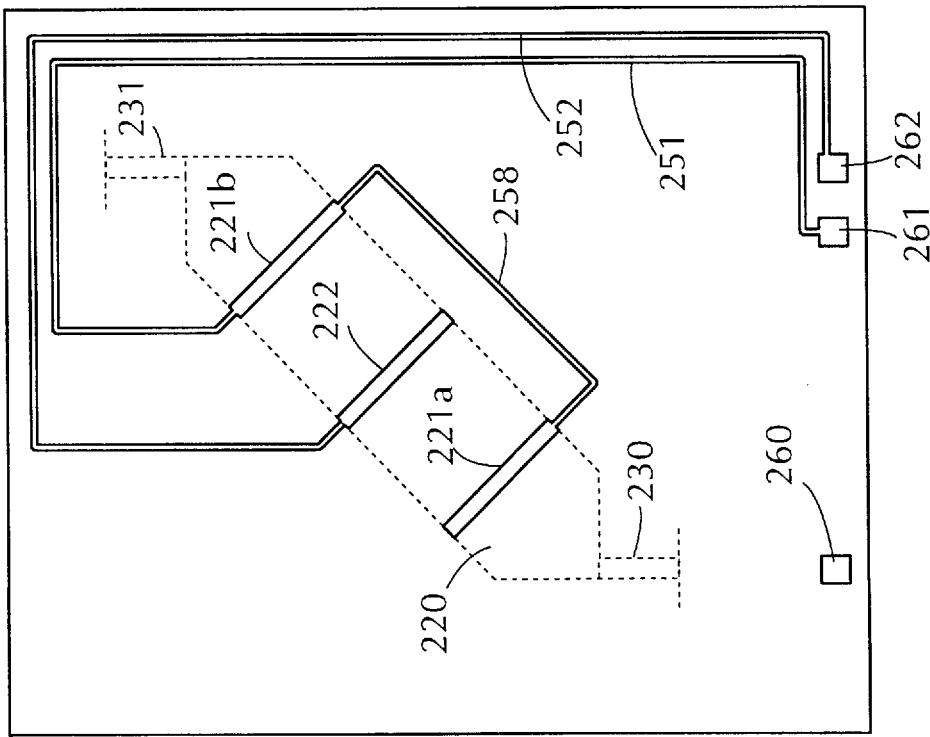
Figure 14A:
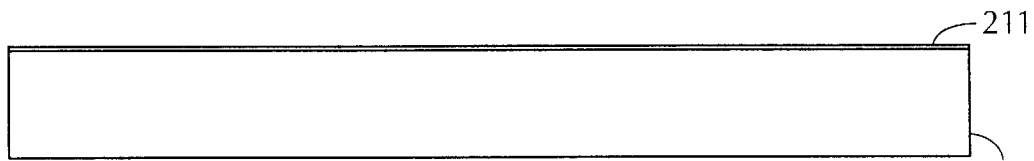
Figure 14B:
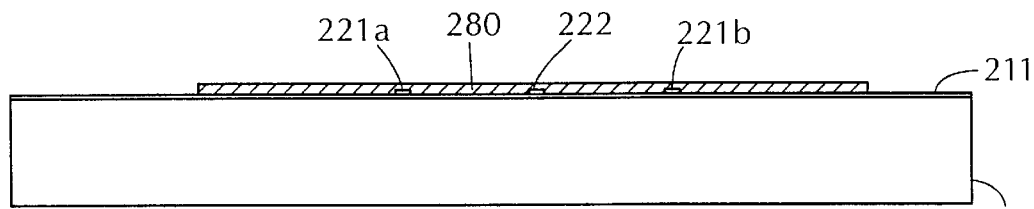
Figure 14C:
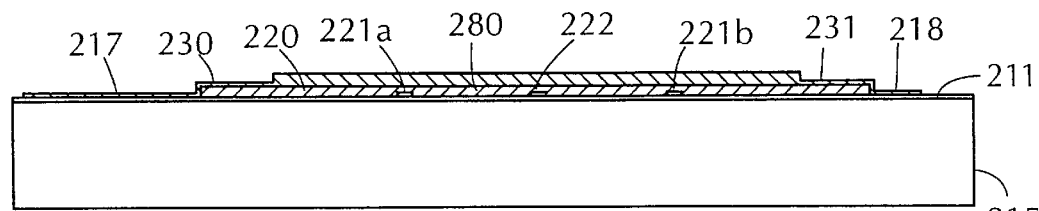
Figure 14D:
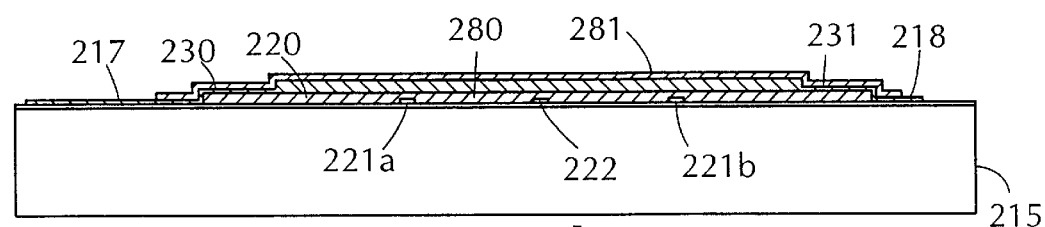
Figure 14E:
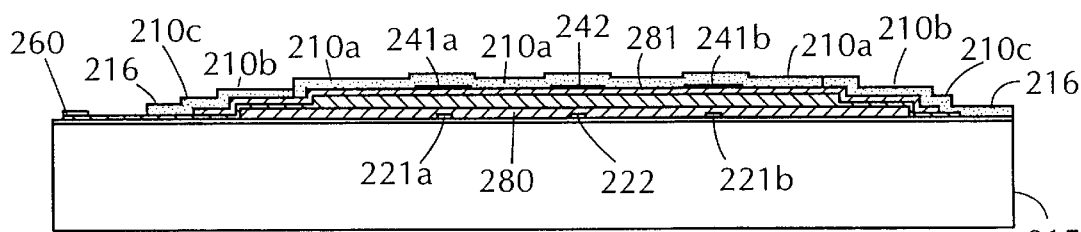
Figure 14F:
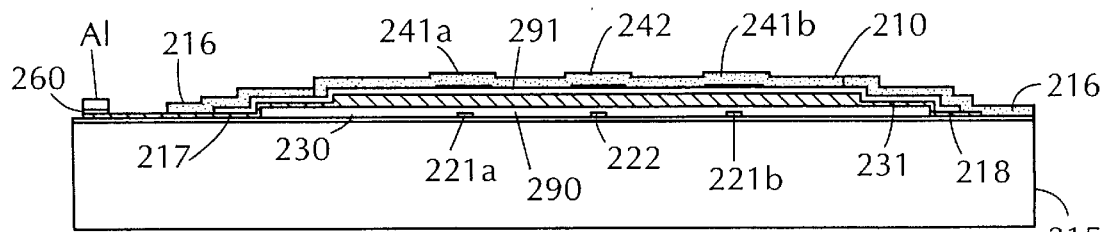
Figure 15:
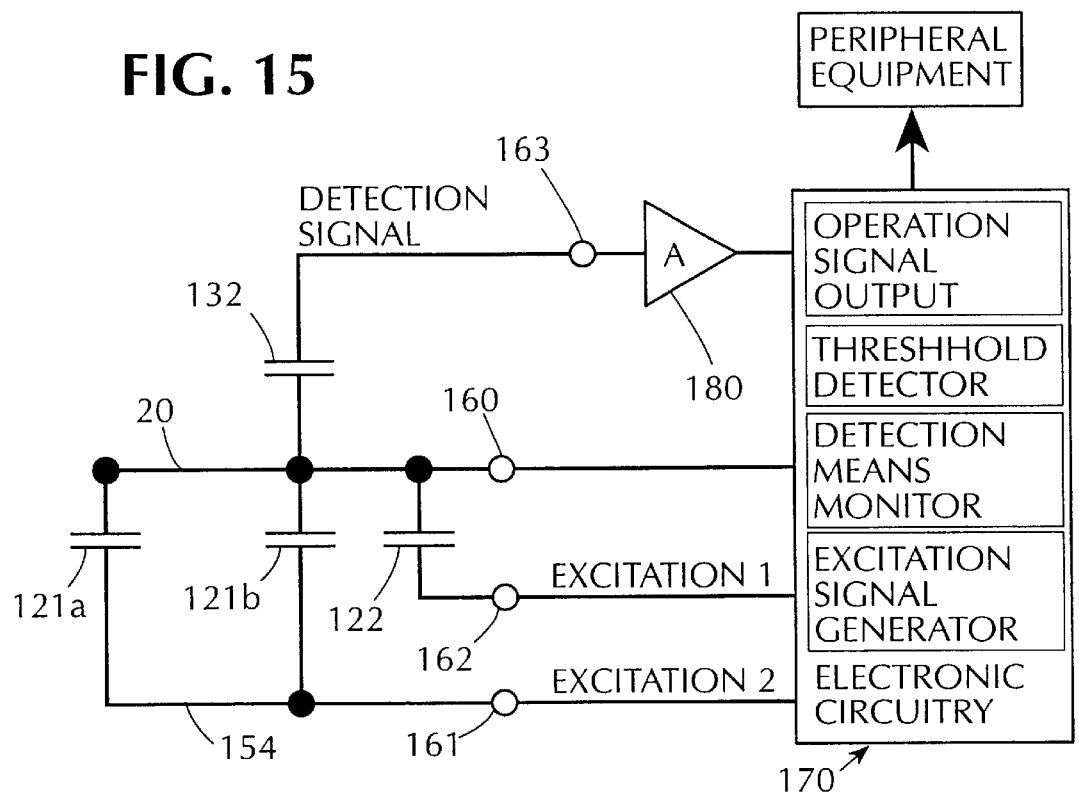

FIGS. 11a–f show main process steps used to build the structure of FIG. 9 by using a combination of bulk micromachining by etch-stop against PN-junction and use of surface micromachining in poly-silicon;

FIG. 12 shows as an example a fourth detailed realisation of the embodiment of this invention by building the resonant plate in deposited poly-silicon films and using capacitive sensing and electrostatic force for excitation by using an electrode system on both sides of the resonating plate;

FIG. 13a shows a pattern of excitation electrodes with their interconnections and FIG. 13b shows capacitive sensing plates and their interconnections for the embodiment of FIG. 12; and FIGS. 14a–f show main process steps used to build the structure of FIG. 12 by using a sequence of depositing and etching patterns in poly-silicon layers and sacrificial oxide layers on both sides of the resonating plate;

FIG. 15 is a simplified circuit diagram for the embodiment of FIG. 9.

Figure 16:
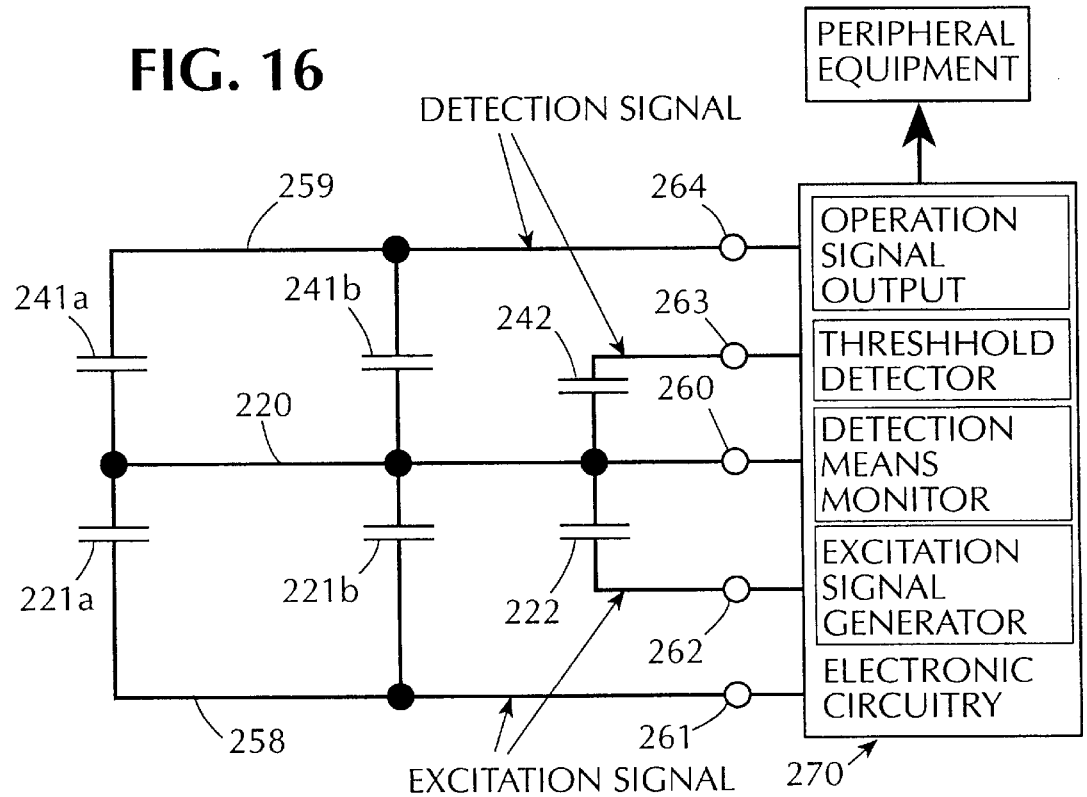

FIG. 16 is a simplified circuit diagram for the embodiment of FIG. 12; and

Figure 17:
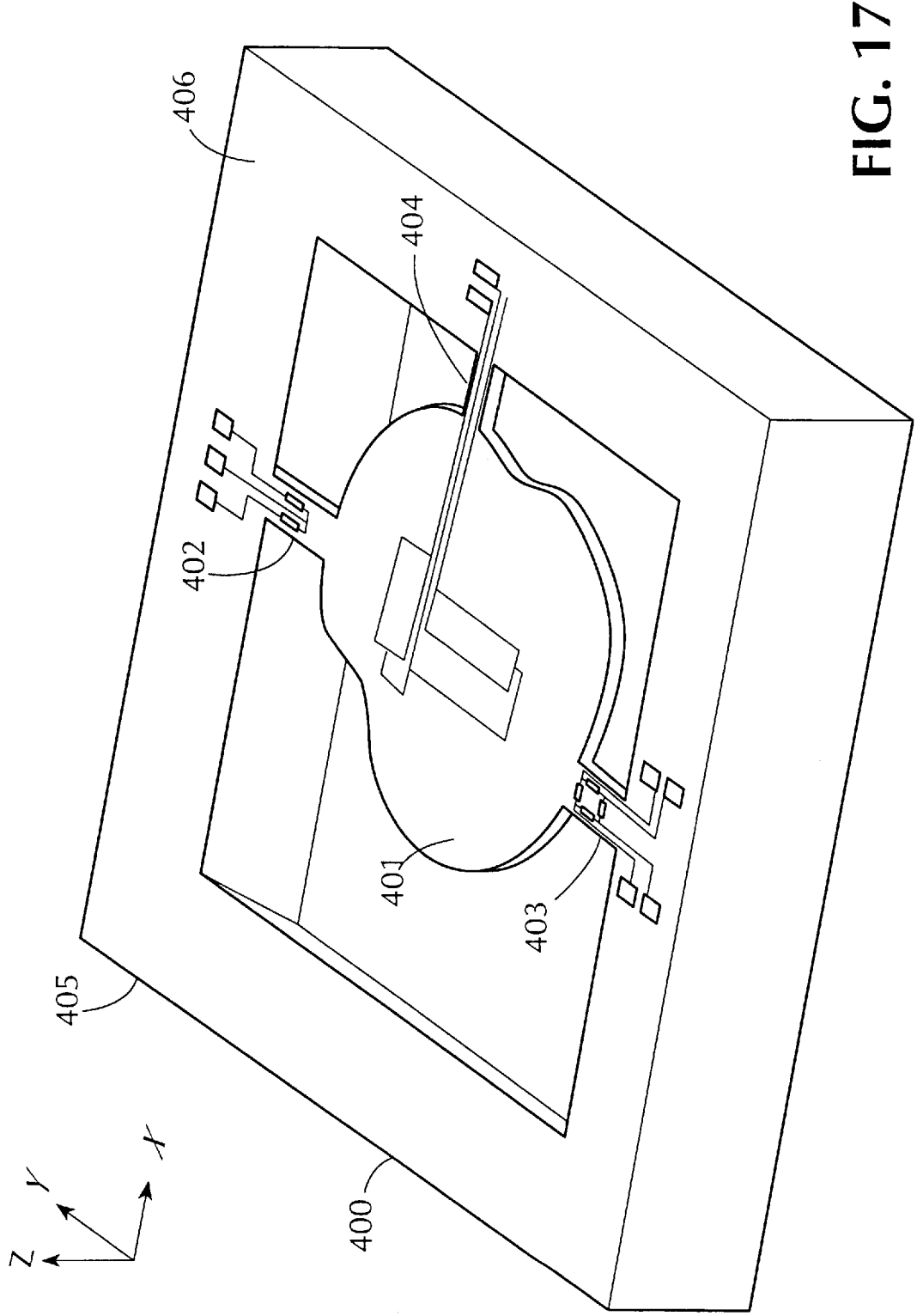

FIG. 17 shows a more generalized, non-limitative geometrical shape for the plate formed mass-spring system and three beams, according to the invention.

A force sensor can be designed in a large number of geometries by using this principle. One non-limitative example of the realisation of the geometry of such a force sensitive mass-spring system is shown in FIG. 1. The geometry of FIG. 1 has been found after extensive investigation of the force sensivity for a large number different geometries including systems with one, two and more beams supporting one plate, and three and more beams supporting two or more plates.

Figure 2:
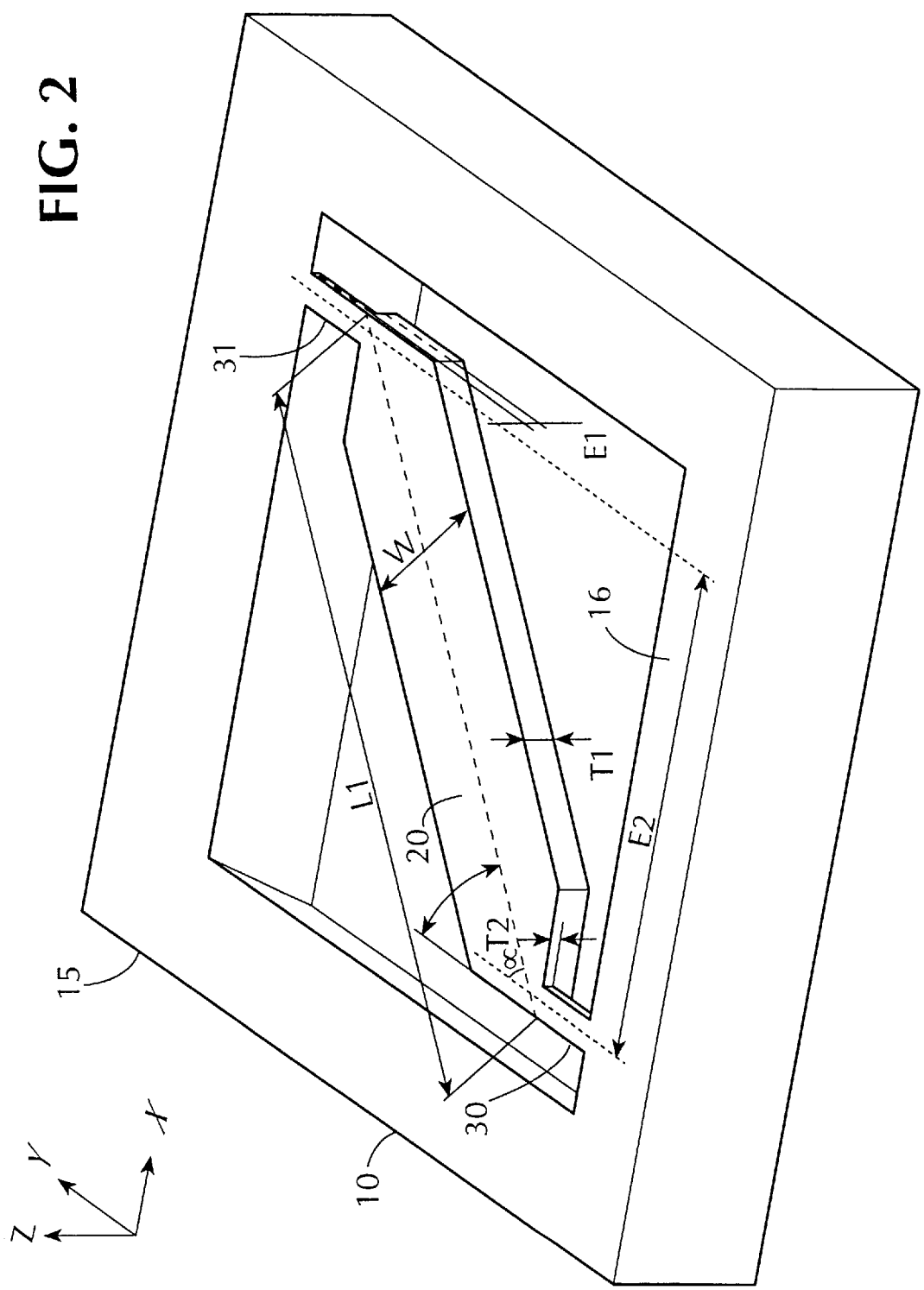

The general geometry for a force sensors covered by this invention can be envisaged from studying attached FIG. 17, consisting of a resonant flexible plate type mass of arbitrary geometry that is suspended by two or more flexible beams. The beams must be located on different sides of the plate and supported on a stiff frame. The respective midplane of the beams is off-set relative to the midplane of the plate. All geometries of such type of designs will be acceleration sensitive caused by the interactions between the stress field set up by the seismic force caused by the seismic mass and the stress field caused by the resonant vibration mode of the plate. The force sensitivity is optimized by:

location of the beams at the periphery of the plate
geometry of the plates (thickness/shape/length/width)
geometry of the beams (thickness/length/width)
angle between symmetry planes and lines of the plate and the beams as shown in the specific example by the angle α ("alpha") and distance E2 as indicated in FIG. 2.

Excitation and detection of the force sensitive vibration mode can be done using different methods of which (a) thermal excitation and piezoresistive pick-up with resistors integrated on the resonating structure itself and (b) electrostatic excitation and capacitive pick-up are considered to be preferred product realisations for embodiments of the invention for low cost manufacturing. More generally, excitation can be done by the following well known methods within the science of sensor research and development:

(a) Thermal excitation by location of resistive structures like semiconductor resistors or thin-film resistors, leading to thermal expansion forces due to thermal gradients.
(b) Thermal excitation by laser spot focused on the structure by optics or via optical fiber.
(c) Electrostatic excitation with dielectric force by using a nearby electrode system and setting up an AC voltage between the structure and the electrode system.
(d) Excitation by magnetic force by using a coil system.
(e) Excitation by piezoelectric force by deposition of piezoelectric films.

Detection can be by:
(a) Capacitance change, differential or absolute.
(b) Piezoresistive.
(c) Piezoelectric.
(d) Interferometric by laser light.

As can be seen by persons skilled in the art, the preferred embodiments of this invention provide basis for developing many future modifications and variants of the invention.

Designing a force sensor by using the resonant structure itself as the acceleration sensitive seismic mass-spring system is the most ideal integration solution that can be used to accomplish a low cost solution by simplified processing and the possibility of designing a small sensor die.

With such a structure inherent self-test is built into the design in that continuous monitoring using the detection principle is a result of the inventive structure and that no additional test features are needed to test that the system is operative as a force sensor. This inherent self-test feature is of special importance for applications in safety systems. A very significant aspect of the invention is that this self-test feature does not add extra cost to the sensing element.

Great flexibility exists in designing accelerometer based on the general geometry of this preferred embodiment. The length, thickness and width of the beams and the geometry of the plate formed mass-spring system can be varied to an almost infinite number of versions. Some important limitations in dimensions to be used in a specific design are that (a) the chosen vibrational mode must have a high Q-factor and (b) good frequency separation to other vibrational modes. Extensive use of finite element computer modelling is needed to develop good designs having high acceleration sensitivity and linearity for each specific application.

Accelerometers, flow sensors and other force sensors designed in accordance with geometry of this invention can be processed by micromachining of single-crystal silicon combined with processes known from integrated circuit processing techniques. The same geometry can also be made by surface nicromachining in poly-silicon and the use of sacrificial oxide layers and etching.

As mentioned above the invention can be realized by many different geometrical designs and by different excitation and detection methods.

The invention claimed herein will be better understood from the following description of examples of preferred embodiments.

Figure 3:
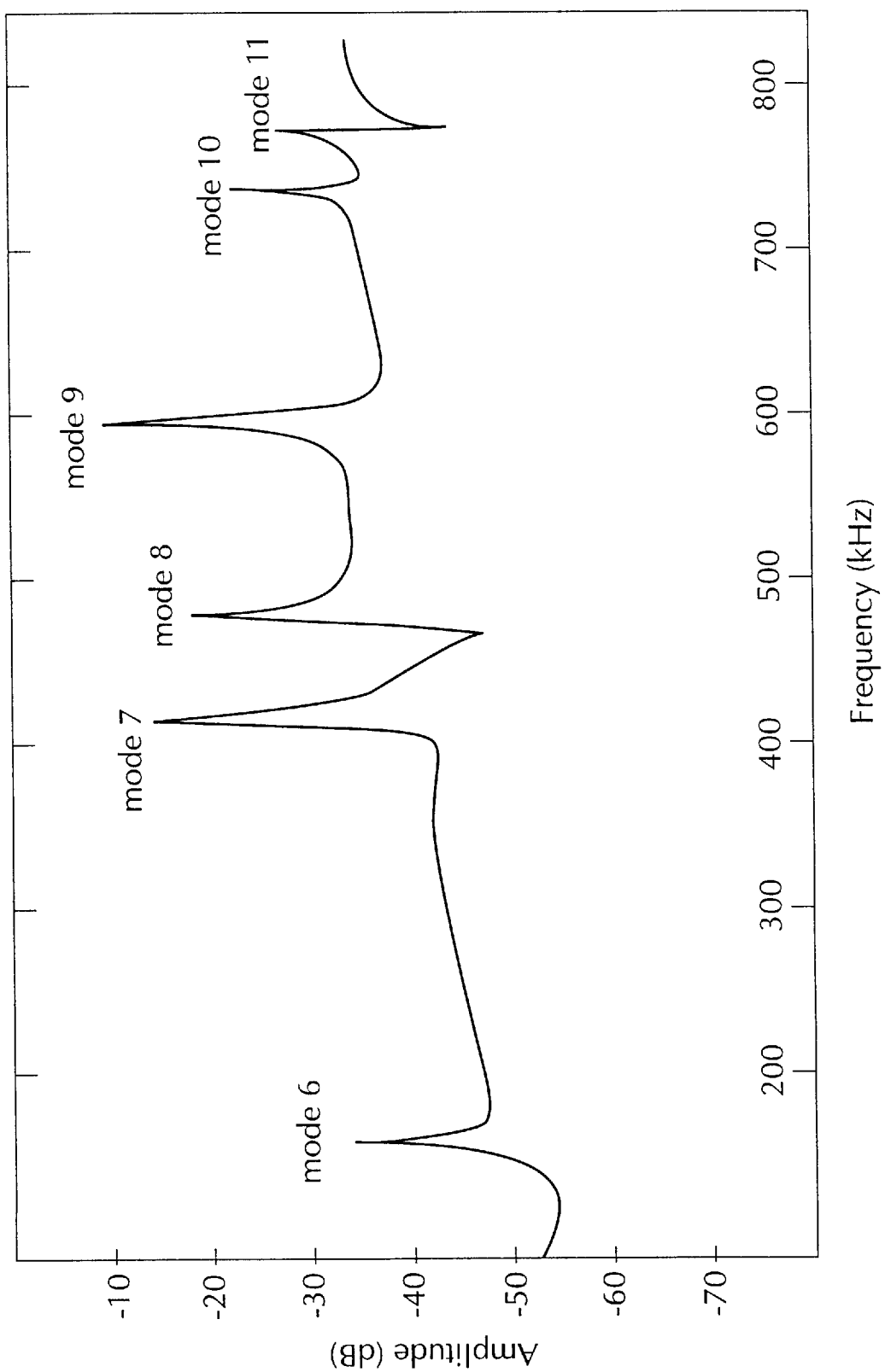
FIG. 3 shows a plot of a typical frequency spectrum for the non-limitative example shown in FIG. 1 and with higher order resonant peaks as measured by using a piezoresistive bridge on one of the beams, modes 7, 8 and 9 all being acceleration sensitive.

Referring to FIG. 1 a force transducer 10 is fabricated on a silicon substrate 15. The transducer is built with a flexible plate formed mass-spring system 20 suspended on two thinner flexible beams 30 and 31 at opposite ends of the plate, said beams being fixed to a rigid frame 16 made from the silicon substrate 15. The flexible plate 20 of this embodiment has an oblong polygonal form and a certain thickness T1. The two beams 30 and 31 of same geometry in this example have a thickness T2 which is less than the thickness of the plate 20 and are located with their principal axis in the same direction Y and with one surface in the plane of one of the surfaces of the plate 20 as seen in FIG. 1, making a longitudinal midplane at the half thickness location of the beams 30 and 31 eccentric to a midplane of the plate 20. The geometry of this device will have an infinite number of resonant modes being of flexural or torsional type or combinations thereof. Critical dimensions for the embodiment of FIG. 1 are shown in FIG. 2. The functionality of this embodiment acting as a force transducer relies upon the correct combination of the features shown in FIG. 2; viz. (i) the eccentricity E1 of the midplanes of the beams 30, 31 and the plate 20 in the thickness direction, (ii) the eccentricity E2 of the beams 30, 31 and (iii) the orientation of the principal axes of the beams relative to the longitudinal direction of the plate 20 in FIG. 1 defined as angle α. Angle α may suitably lie in the range 15–75 degrees. However, in a preferated embodiment the angle α is suitably 45 degrees. By choosing, as a non-limitative example, the thickness T2 of the beams 30 and 31 to be 3 micrometer, their length to be 145 micrometer and their width to be 34 micrometer, the thickness T1 of the plate 20 to be 20 micrometer, the length of the centerline of the plate to be 1020 micron and the width of the midsection of the plate to be 260 micron, a frequency spectrum as shown in FIG. 3 is found. Among the higher order resonant modes of which all being mainly flexure modes with very little torsional movement, mode 7 has its resonance top at 422 kHz with an acceleration sensitivity frequency shift of about 8 Hz/g, mode 8 has its resonant top at 483 kHz with an acceleration sensitivity 9 Hz/g and mode 9 has its resonance frequency at 602 kHz and acceleration sensitivity of about 6 Hz/g. The calculated node lines of mode 9 for this design is shown in FIG. 4a with the corresponding movement of the midline through the plate and beams of mode 9 shown in FIG. 4b. The damping of the resonant modes is a function of gas pressure around the resonator and internal damping in the plate giving a quality factor Q in the range 1000–2000 at atmospheric pressure.

Although the dimensions of the beams and the plate at present could be as low as T2=3 μm and T1=20 μm, further improvements in manufacturing technology could possibly yield lower dimensional values.

The preferred embodiment of FIG. 1 can be realized by a variety of excitation methods and detection methods, as mentioned earlier. A more detailed example of the embodiment of FIG. 1 includes the use of thermal excitation provided by diffused resistors and pick-up of the resonance frequency by the use of piezoresistive resistors. The excitation resistors can be located on the plate as shown in FIG. 5 or on one of the beams as shown in FIG. 8. Detection of the resonant movement should in this case be detected by piezoresistors located on one of the beams. For detection one resistor can be used taking up the minimum possible area as shown in FIG. 5, or by two or more resistors as shown in FIG. 8 where a full Wheatstone bridge is used.

The embodiment will now be described for a structure designed to vibrate at resonant mode 9 as shown in FIG. 4 and with reference to FIG. 5. In FIG. 5 excitation resistors 21a, 21b and 22 are integrated into the surface of the flexible plate 20. These resistors are located at the lines of maximum deflection of resonant mode 9 as shown in FIGS. 4a and 4b. Electrical connections are made to these resistors by standard silicon integration methods using low-ohmic diffused conductors or thin film metal interconnections. Excitation resistors 21a and 21b are connected in parallel to interconnection lines 51 and 52 and terminated at wire bonding areas 61 and 62. The excitation resistor 22 is connected via interconnection lines 53 and 52 to the wire bonding areas 63 and 62. In this detailed example the excitation resistors are connected with a common reference via interconnection line 52 and wire bonding area 62 to reduce the number of interconnection lines to a minimum. The excitation resistors are coupled to electronic circuitry 40 via interconnection lines 41, 42 and 43. For detection of the resonant movement a piezoresistor 32 is located at the surface and near the end of the spring 30. A passive and matching resistor 33 is in this example located on the rigid peripheral area 16 of the silicon chip 15, thus forming a half measuring bridge located on the chip. The half-bridge is connected to the electronic circuitry 40 via interconnection lines 55, 56 and 57 on the chip 15, connections provided by wire bonding areas 64, 65 and 66 and interconnection lines 44,45 and 46. Excitation at resonant mode 9 can now be done by forcing electric power pulses through the excitation resistors 21a, 21b and 22 at a frequency equivalent to the plate resonance frequency for mode 9. Resistor 22 is pulsed with electric pulses 180 degrees phase shifted relative to the pulses provided to resistors 21a and 21b. The electric power consumed by the resistors will cause the respective areas of the flexible plate 20 to be heated and expand by thermal expansion and in this way setting up mechanical forces in the plate 20 forcing the plate 20 to vibrate at the frequency of resonant mode 9, the beams 30 and 31 being thin and flexible enough to follow this movement. It is obvious for persons with skills in this art that resistors 21a and 21b may also be coupled in series to obtain the same point heating effect. They may also be located at other areas on the plate. Detection of the resonant vibrations can be done either by single element piezoresistors or by half-bridge or full-bridge piezoresistor arrangements located on high stress areas on the vibrating plate 20 or on the beams 30 and 31. When the complete plate and the beams 30 and 31 are flexing in the resonant mode the mechanical stress in the piezoresistor 32 will change with the stress, thus resulting in a signal at the output from e.g. the half-bridge 32, 33 that is varying with the resonance frequency of the resonant vibration. The output signal from the bridge is fed back to the electronic circuitry 40 forming a closed locked loop. The electronic circuitry 40 can be realized in many different ways. One well known way is to build as a phase-locked loop or self-oscillating loop that keeps the flexible plate mass-spring system at it resonance frequency and that can be read with a proper output signal. When the plate mass-spring system is subjected to an acceleration force in the Z-direction perpendicular to the surface plane of the plate, additional forces are set up in the beams 30 and 31 and the plate mass-spring system 20, thereby changing the detected resonance frequency. The detailed embodiment of FIG. 1 with dimensions as already mentioned has a linear response to acceleration forces in the Z-direction from −500 g to +500 g.

It is obvious for those skilled in this art that other resonant modes such as modes 7 and 8 can be used by locating excitation resistors in the same way on the plate at areas of maximum deflection for the particular resonant modes to be used to detect the load force. More generally, excitation at the acceleration sensitive resonant mode can be done by having one, two or more resistors on the plate formed mass-spring system, and/or on the beams, these resistors being pulse-heated at the frequency of the resonant mode to be excited and detection to be done by piezoresistors located at high stress areas on the vibrating plate and/or the beams.

Figure 6A:
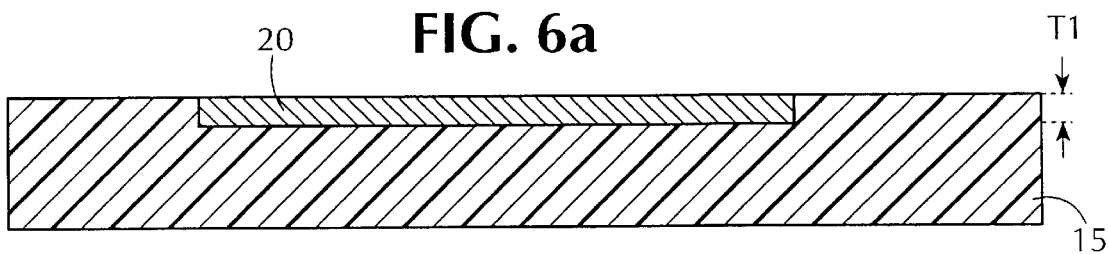
Figure 6B:
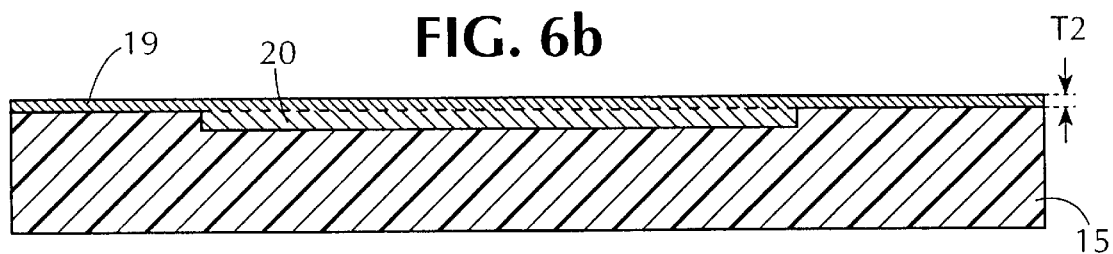
Figure 6C:
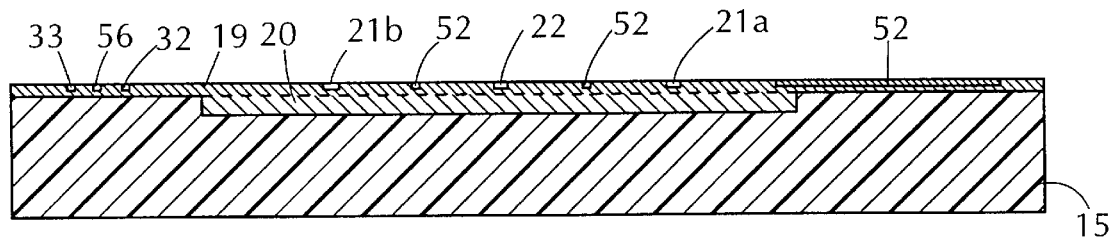
Figure 6D:
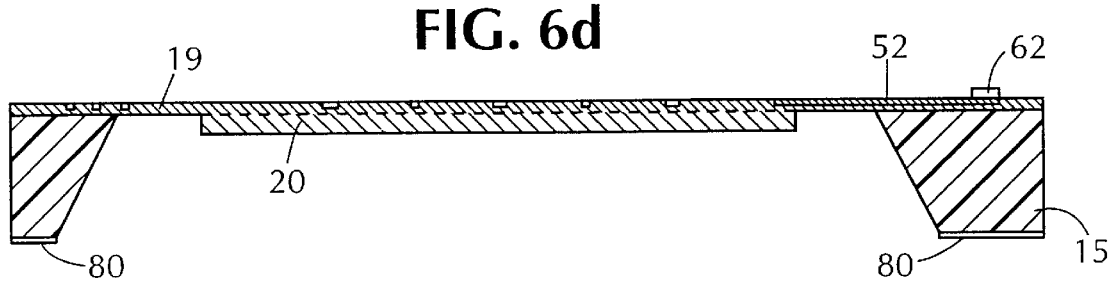
Figure 6E:
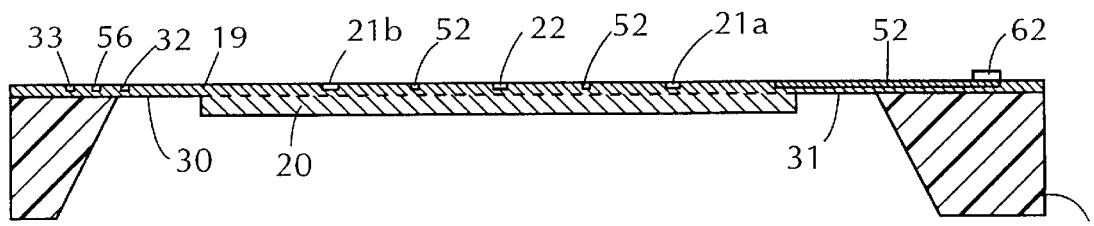

The force transducer of FIG. 5 can be manufactured by using conventional silicon wafer processing method and silicon micromachining technology. FIG. 6e shows a cross-sectional view of the embodiment of FIG. 5 along line Y1–Y2. The processing method is more specifically shown on FIG. 6, with reference to cross-section Y1–Y2 of FIG. 5. Processing is started on <1-0-0> P-type silicon substrate 15. The first two main steps are to form the thickness T1 of the plate 20 and the thickness T2 of the beams 30,31 as N-type areas to make possible selective etching of the P-type silicon and stop the etch against the PN-junction at a later step in the process sequence. By a standard first photolithographic masking and etching step the pattern of the plate 20 is defined, doped by ion implantation and diffused to the correct depth corresponding to plate thickness T1 as shown in FIG. 6a. A second masking step defines an N-type area 19 that 30 covers the complete surface of the device including the beam areas 30 and 31 and the area outside the plate periphery. This N-type area 19 is made by ion implantation doping followed by a drive-in diffusion step to diffuse the N-type dopant to the depth of the PN-junction corresponding to the beam thickness T2 of the layer 19 as given in FIG. 6b. It is obvious for those familiar with silicon process technology that this N-type layer can also be made by growing an epitaxial layer followed by doping the P-type contact for the P-electrode by a separate masking and boron doping step. Excitation resistors 21a, 21b, 22, piezoresistor 32 and passive resistor 33 can now be diffused into the surface of the N-doped layer as P-type resistors and interconnection lines 51, 52, 53, 55, 56 and 57 as low-ohmic P-type diffusions by conventional silicon processing as the next steps, as shown in FIG. 6c. The next step is to make metal connection areas 61, 62, 63, 64, 65, 66 and to use a selective etch which stops against the PN-junction between the P-substrate 15 and the N-type plate 20 and N-type beams 30, 31 by using proper well known masking techniques such as silicon nitride 80 as shown in FIG. 6d. This is now followed by a dry silicon etch through the thin N-area around the plate 20 and the beams 30 and 31 hereby releasing both the plate 20 and the beams 30 and 31 of the device as shown in FIG. 6e. This completes the processing of this detailed example of the embodiment of the invention and the force sensor can now be built into a cavity package or integrated into a package together with the electronic circuitry 40.

FIG. 7 shows a modified method of that just explained for the method of FIG. 6. Steps of FIGS. 7a and 7b are the same as for FIGS. 6a and 6b. In the step of FIG. 7c, contrary to that of FIG. 6c, the excitation resistors 21a', 21b', 22', the piezoresistor 32' and the passive resistor 33' are made from deposition of thin film-resistances in a manner known to any expert in the art. Similarly, conductor films 52' and 56' are deposited in a manner known to any expert in the art, the exact dimensions of the resistors and conductors being determined through conventional etching process. In the stops of FIGS. 7d and 7e, a similar etching process as that explained for FIGS. 6d and 6e is carried out.

FIG. 8 is a variant of the embodiment of FIG. 5, the basic difference being that excitation is created at one of the beams 31 by using thermal excitation resistors 98 and 99 and detection is made at the other beam 30 by using a full Wheatstone bridge with resistors 93, 94, 95 and 96. Electronic circuitry 70 is provided to connect to an excitation assembly 97 and a detection assembly 92. The excitation assembly shown in the high level block electronic circuit of FIG. 8 includes two resistors 98 and 99, either of diffused or deposited, thin-film type resistors. The resistors 98 and 99 have a common connection to contact area 72 via interconnection line 75. Resistor 98 connects with contact area 71 via interconnection line 74. Resistor 99 connects with contact area 73 via interconnection line 76. The electronic circuitry 70 connects with contact areas 71, 72 and 73 via respective wires 77, 78 and 79 to provide resistors 98 and 99 selectively with pulsating current to create a vibration mode in the plate formed mass-spring system 20, said vibration mode detectable by assembly 92. The electronic circuitry 70 includes an excitation signal generator 70a delivering excitation signals of a specific frequency to lines 77, 78 and 79, a detection means monitor 70b connecting with lines 88, 89, 90 and 91, a threshold detector 70c detecting whether an output from the monitor 70b exceeds a threshold, in which case the detector 70c causes operation signal output 70d to deliver a trigger or operation signal to a peripheral device 70e such as e.g. a vehicle air bag inflator or deployment device. The detection assembly 92 has piezoresistors 93–96 connected in a Wheatstone bridge fashion and in contact with contact areas 80, 81, 82 and 83 via interconnection lines 84–87. Further, the contact areas 80, 81, 82 and 83 are interconnected with the electronic circuitry 70 via wires 88, 89, 90 and 91, respectively. Although only two excitation resistors 98 and 99 have been shown, the present embodiment is an example only, and a different number of pulse heated resistors may be envisaged. In the piezoresistor assembly 92, a Wheatstone bridge structure is provided. The piezoresistors 93 and 95 are transversal resistors, and the piezoresistors 94 and 96 are longitudinal resistors.

An important advantage of the embodiment of FIG. 8 is that all of the higher order acceleration sensitive resonant single mode vibrations can be excited individually by using an input signal close the resonance frequency for the particular mode to be used.

The electronic circuitry 70, as well as corresponding circuitry 40 of FIG. 5, circuitry 170 of FIG. 15, or circuitry 270 of FIG. 16 are all designed as self-oscillation loops capable of producing alternating or pulsed excitation signal in electrical current or voltage pulses, and can detect changes in the piezoresistors resulting from the applied forces to the plate formed mass 20. The specific means for producing such excitation signals as well as detecting output are all of a type well familiar to an expert in the art.

It will now be explained how the embodiment example of FIG. 1 and the use of resonant mode 9 of FIG. 4 can be realized by using electrostatic force as excitation mode and capacitance change as detection mode, with reference to a third detailed embodiment shown in FIG. 9. This embodiment is based on the same type of silicon substrate 15 with the same flexible and electrically conductive plate 20 suspended by the two flexible and conductive beams 30 and 31 at opposite sides of the plate, these beams being fixed to the rigid frame 16 of the substrate 15. An undoped semi-insulating poly-silicon lid 110 is built over the area of the plate 20 and the beams 30 and 31 at a short distance therefrom, supported by and resting on the frame 16 and covered by an insulating layer (not shown). A cross-section Y10–Y11 is made through the lid 110 along planes perpendicular to the plane of the surface of the plate 20 and beams 30, 31 showing excitation electrodes 121a, 121b and 122 for enforcing vibration mode 9 and electrode 132 to act as a detector capacitor. These electrodes and their interconnection lines 151, 152 and 153 are made on the bottom side surface of the poly-silicon lid as doped low-ohmic poly-silicon conductors or high temperature resistance thin-film metal such as tungsten with pattern as shown in FIG. 9. These lines 151–153 connect with respective electrical contact areas 161, 162 and 163. Electrodes 121a and 121b are interconnected by conductor 154. The N-type doped electrical conductive plate 20 and beams 30 and 31 can be connected via the contact area 160 and form a common electrode for the excitation electrodes 121a, 121b, 122 and also form the second electrode for the detection capacitor with its first electrode 132. Electronic 170 circuitry as will be explained in connection with FIG. 15 can then be coupled to the device of this embodiment by electrical connections through the contact areas 160, 161, 162 and 163 in a similar way as given in the example of FIG. 5.

Excitation of resonant mode 9 can now be done by applying voltage pulses to the excitation electrodes at a frequency equivalent to the resonance frequency of resonant mode 9. Electrode 122 is pulsed with voltage pulses 180 degree phase shifted compared to the voltage pulses applied to electrodes 121a and 121b. The electric field between the electrodes and the plate 20 will set up electrostatic forces between the electrodes and the plate, thereby causing a bending of the plate in the direction of the electrical field, and thereby enforcing vibrations in the plate 20 at the frequency of vibration mode 9. Since the acceleration sensitivity is defined by the mechanical dimensions and the elastic properties of silicon only and not by the electrical parts, the sensitivity of this embodiment will be the same as for the embodiment of FIG. 2 with the same mechanical dimensions of the plate and the beams.

The detailed embodiment of force transducer according to FIG. 9 can be manufactured by using conventional silicon wafer processing method and silicon micromachining technology. The processing method is more fully understood by reference to FIG. 11, and with further reference to cross-section Y10–Y11 of FIG. 9. FIG. 11ƒ shows the cross-sectional view Y10–Y11 of FIG. 9. Processing is started on a <1-0-0> P-type silicon substrate 15 as for the embodiment of FIG. 5. The result of the first two main steps are shown on FIG. 11a and are to form the thickness T1 of the plate and the thickness T2 of the beams as N-type areas to make possible selective etching of the P-type silicon and stop the etch against the PN-junction at a later step in the process sequence. By standard photolithographic masking and etching steps the pattern of the plate 20 is defined, doped by ion implantation and diffused to the correct depth corresponding to plate thickness T1 and then followed by an additional photoetching and doping step for the pattern of the beams but leaving undoped P-areas around the plate and along the sides of the beams to allow at a later stage the complete plate and the beams to be etched to the original surface of the substrate 15 by etch-stop against PN-junction process. In FIG. 11b a pattern of oxide 150 with high etch-rate in hydrofluoric acid is deposited by low-temperature vapour deposition (LTVD) and formed by standard photoetching techniques to be used as a sacrificial layer at a later stage in the process sequence. In FIG. 11c is shown the electrically conductive poly-silicon or tungsten electrodes 121a, 121b, 122, 132 as well as the complete interconnection pattern of FIG. 9 including all the interconnection lines 151, 152, 153 and 154 of which only lines 151 and 152 appear in section Y10–Y11 of FIG. 9. In the following steps shown in FIG. 11d the semi-insulating undoped polysilicon material for the lid is deposited and formed over the sacrificial layer 150, the electrodes and the support frame for the lid 111. Holes are formed in this semi-insulating poly-silicon at the areas of the electrical contacts regions 160, 161, 162 and 163. The next steps as shown in FIGS. 11d and 11e are now to form aluminium electrical contacts 170, 171, 172, 173 onto the contact regions 160, 161, 162, 163 (only contact 170 has been shown with corresponding region 160) and performing the etch-stop process to remove P-type silicon all the way to the PN-junction in the substrate around the plate formed mass 20 and the beams 30,31 by using an etchmask 180. In this etch step the P-type silicon is removed around the plate 20 and along the sides of the beams 30, 31 leaving and exposing the sacrificial layer 150 at these areas. In the last step as shown in FIG. 11ƒ the sacrificial oxide layer 150 is removed in hydrofluoric acid HF by masking the front side of the wafer with its metal with a polyimide which is removed after the completion of the etching of the sacrificial layer 150. This completes the processing and leaves an air space 174 between the lid 110 and the electrodes 121a, 121b, 122, 132 and interconnection lines 151, 152, 153, 154 on the lid 110 and at the same time enabling the plate 20 on its supporting beams 31 and 31 to freely move in a controlled fashion within said space. This detailed embodiment can now be built into a system including proper electronic circuitry that is needed to drive and keep the plate formed mass-spring system in its resonance mode and to condition the electrical output signal.

The embodiment of FIG. 1 and resonant mode 9 of FIG. 4 will now be further described in relation to the embodiment of FIG. 12, i.e. by using electrostatic force as excitation mode and capacitance change as detection mode, thus describing a fourth detailed realisation of an embodiment of the invention. This embodiment utilizes a different method by using poly-silicon material in the flexible plate formed mass and in the beams. This method allows the embodiment to be integrated with electronic circuitry on a single chip by adding extra process steps to an integrated circuit process, but can also be built as a separate sensor chip with associated electronic circuitry connected thereto. Referring to FIG. 12 a flexible and electrically conductive plate 220 is suspended by means of two flexible, electrically and conductive beams 230 and 231 at opposite sides of the mass. These beams are fixedly connected to the substrate 215 at anchor areas 217 and 218. The plate and the beams are provided with air space adjacent both surfaces thereof to be freely suspended between the substrate 215 and a lid 210. The lid 210 is made of undoped semi-insulating poly-silicon with different sections 210a, 210b and 210c built over and at a short distance from the plate 220 and the beams 230 and 231 and supported by and resting on the substrate 215 with its anchor area 216. The cross-section Y20–Y21 is made through the lid 210 along planes perpendicular to the surface plane of the plate and beams. The substrate supports excitation electrodes 221a and 221b coupled together by interconnection line 254 and excitation electrode 222 for enforcing the vibration mode illustrated in FIG. 4 by means of electrostatic force over the narrow air gap provided between these electrodes and the plate 220 and the beams 230 and 231. These electrodes and their interconnection lines 251, 252 and 253 as also shown in FIG. 13a are made on the surface of the substrate 215 and placed at the area of maximum deflection of the plate 220 for the resonant mode shown in FIG. 4. Capacitive electrodes 241a and 241b and 242 are located on the bottom surface of an uppermost located midsection 210a of the lid 210 and form with the electrically conductive mass 220 capacitors with variable capacitance values, the plate formed mass 220, thus forming a single counter electrode and the air gap between the mid section 210a and the plate formed mass forming the dielectric of the capacitors thus created. The single common electrode created by the plate 220 is electrically connected to contact area 260 via beams 230, contact area 217 and interconnection line 250. The pattern of the capacitance electrodes 241a, 241b coupled together with interconnection line 259 and plate 242 with interconnection lines 253 and 254 to electrical connection and wire bonding areas 263 and 264 are shown in FIG. 13b. The electrode and interconnections pattern of FIG. 13a and FIG. 13b are most effectively made of doped conductive poly-silicon. Electrical circuitry 270 (as explained further in connection with FIG. 16) can now be coupled to the contact areas 260, 261, 262, 263 and 264 in a similar way as given in the example of FIG. 6.

Excitation of resonant mode according to FIG. 4 for this realisation of the embodiment according to FIG. 12 can now be done by applying voltage pulses to the excitation electrodes 221a, 221b, 222 at a frequency equivalent to the resonant mode frequency. Electrode 222 is pulsed with voltage pulses 180 degree phase shifted relative to the voltage pulses applied to electrodes 221a and 221b. The electric field between the electrodes 221a, 221b and 222 and the resonant plate 220 will set up electrostatic forces between these electrodes and the plate 220 and cause a bending of the plate in the direction of the electrical field hereby enforcing the vibrations in the plate formed mass-spring system 220 supported on the beams 230 and 231, at the vibration mode frequency according to FIG. 4. The acceleration sensitivity of this fourth embodiment is defined by the mechanical dimensions and the elastic properties of the polysilicon plate and beams only and not by the electrical parts included therein.

The force transducer of FIG. 12 can be manufactured by using conventional silicon wafer processing method and surface micromachining by using sacrificial layers, as exemplified in FIG. 14. FIG. 14 shows a cross-sectional view along planes denoted by line Y20–Y21 in FIG. 10. FIG. 14 thus shows the main process steps that are used. Processing is started on a silicon substrate 215 with a passivation layer 211 on top as shown in FIG. 14a. The substrate 215 could possibly contain all or parts of electronic circuitry to start and maintain the mass-spring system in its resonant mode and other signal conditioning circuitry to be used together with this embodiment of the invention. In FIG. 14b the pattern of the excitation electrodes 221a, 221b and 222 and their interconnection lines (as shown in FIG. 13a) are formed in a layer of doped poly-silicon. On top of this the first sacrificial oxide layer 280 is deposited by chemical vapour deposition and formed by standard photoetching techniques in the area covered by the lid parts 210a and 210b shown in FIG. 12. In FIG. 14c the shape or pattern of the beams 230 and 231 with their anchor areas 217 and 218 is formed by deposition of a thin layer of poly-silicon and photoetching this layer followed by an additional deposition of a thicker conductive polysilicon layer to form the plate 220. The poly-silicon plate and beams may also be made by depositing and etching the plate first and the beams and their support areas thereafter. A second sacrificial layer 281 is thereafter deposited and formed as shown in FIG. 14d at the area covered by the lid parts 210a, 210b and 210c of FIG. 12. On top of this second sacrificial 281 the capacitor electrodes 241a, 241b and 242 and their respective interconnection lines as shown in FIG. 13b are formed by deposition of a layer of conductive doped poly-silicon and photoetching the required pattern in this layer as shown in FIG. 14e followed by the deposition of a thicker layer of undoped semi-insulating poly-silicon that is formed in the pattern of the lid 210a, 210b, 210c, the anchor area 216 of the lid and including the etching of holes in the layer down to the electrical connection areas 260, 261, 262, 263 and 264. By reference to FIG. 14f the processing of this embodiment of the invention can completed by making depositing and etching the aluminium pads 270, 271, 272, 273 and 274 (only pad 270 being shown on FIG. 14f) at the electrical connection areas 260, 261, 262, 263 and 264 and by etching many small holes 292 and 293 through the lid 210 as shown in the areas 210b and 210c of FIG. 12, followed by etching the sacrificial layers in HF by masking the aluminium connection pads and lines with polyimide and removing this polyimide after completion of the etching of the sacrificial layer 280. As shown in FIG. 14f the present embodiment is now completed leaving air volumes 290 and 291 around the plate formed mass-spring system 220 and the beams 230 and 231, thus providing a suspended system with the beam 230 effectively anchored to the substrate 215 at anchor area 217, beam 231 anchored to the substrate at anchor area 218 and with the flexible plate 220 free to move in the z-direction, i.e. right angles to the substrate, that direction being the sensing direction of the present embodiment.

FIG. 15 shows a high level electronic circuit diagram being a self-oscillating loop to be used for the embodiment of FIG. 9. Excitation voltage signals are supplied from the electronic circuitry 170 via contact areas 160, 161 and 162 to the electrodes of the first capacitor 121a and the electrodes of the second capacitors 121b 180 degrees out of phase with the excitation signal supplied to electrodes of the third capacitor 122. Movement of the plate 20 will lead to a change in the distance between the end of the plate and the electrode of the detection capacitor 132, resulting in capacitance change with the same frequency as applied mechanical vibration. The signal from the capacitor 132 is fed into a charge amplifier 180 via contact area 163 and then to the electronic circuitry 170 built as a closed self oscillating loop or a phase locked loop.

The electronic circuitry 170 includes an excitation signal generator 170a delivering excitation signals of a specific frequency to terminals 161, 162 and 160, of which terminal 160 is a terminal common for both the excitation and detection side of the layout in FIG. 15, a detection means monitor 170b connecting with terminals 163 and 160, the connection with terminal 163 being via output of amplifier 180, a threshold detector 170c detecting whether an output from the monitor 170b exceeds a threshold, in which case the detector 170c causes operation signal output 170d to deliver a trigger or operation signal to a peripheral device 170e such as e.g. a vehicle air bag inflator or deployment device.

FIG. 16 shows a high level electronic circuit diagram to be used for the embodiment of FIG. 12. Excitation voltage signals from the electronic circuitry 270 via contact areas 260, 261 and 262 are supplied to the electrodes of the first capacitor 221a and the electrode of the second capacitors 221b 180 degrees out of phase with the excitation signal supplied to electrode of the third capacitor 222. The resonant vibrations in the plate formed mass-spring system 220 will lead to a deflection along the equivalent plate formed mass-spring system 20 as shown in FIG. 4b leading to a time variable change in the distance between the plate 20 and the opposite electrode of capacitors 241a, 241b and 242 with signal on capacitor 242 180 degrees out of phase with signal on capacitors 241a and 241b. The signals from the detection capacitors 241a, 241b and 242 are fed into the electronic circuitry 270 via contact areas 260, 263 and 264 that is built as a self oscillating loop or a phase locked loop.

The electronic circuitry 270 includes an excitation signal generator 270a delivering excitation signals of a specific frequency to terminals 261, 262 and 260, of which terminal 260 is a terminal common for both the excitation and detection side of the layout in FIG. 16, a detection means monitor 270b connecting with terminals 263, 264 and 260, a threshold detector 270c detecting whether an output from the monitor 270b exceeds a threshold, in which case the detector 270c causes operation signal output 270d to deliver a trigger or operation signal to a peripheral device 270e such as e.g. a vehicle air bag inflator or deployment device.

Thus, in its preferred and more general form, this invention provides a geometry for a force sensor that is used by setting up a defined resonant vibrational mode in a force sensitive flexible plate formed mass-spring system. The generalized geometry for a force sensor according to the principles of this invention is shown in FIG. 17, consisting of a flexible resonant plate type mass-spring system 401 of any geometry that is suspended by two or more thinner flexible beams 402, 403 and 404, the third beam 404 representing any and optional extra number of beams more than two. The beams must be located on different sides of the plate 401 and supported by a stiff frame 400. The geometrical midplane through the beams 402, 403 and 404, respectively is off-set and parallel relative to a geometrical midplane of the plate 401. A resonant vibration mode can be set up in the flexible plate formed mass-spring system. Acceleration or fluidic pressure force acting on the plate 401 will change the mechanical stress and the stiffness of both the beams 402, 403 and 404 and the flexible plate 401, thereby causing a change of the resonance frequency of the plate.

Any preferred geometry of this general layout will be acceleration sensitive caused by the change in the interactions between the stress field set up by changes in the acceleration force acting on the plate formed mass and the stress field of the resonant vibration mode in the plate.

The force sensitivity of a particular designed structure can be optimized by:

location of the beams on the periphery of the plate
 geometry of the plate (thickness/shape/length/width)
 geometry of the beams (thickness/length/width)
 angle between symmetry planes and lines of the plate and the beams as shown in the specific example by angle α ("alpha") and distance E2 of FIG. 2.

As will be appreciated, the vibration made of the plate is a function of the excitation frequency acting thereon. The dimensions of the plate will determine the locations of the vibration peaks in the frequency spectrum. The higher order modes, such as modes 7, 8 and 9 will be particularly accelerations sensitive. Any movement attenuation of the beam due to air will be negligible. The reason is relatively little displacement of mass and small amplitudes.

We claim:

1. A force sensor device for sensing seismic force due to changes in acceleration or pressure, comprising mass-spring system formed by
 a resonant flexible plate forming system mass and suspended from a rigid frame by means of at least two beams forming system springs and located at different sides of the plate, said plate, frame and beams being made of a silicon,
 vibration excitation means which upon application of electric signals at an elected one of a plurality of specific frequencies interact with the plate to create a corresponding specific vibration mode therein, and
 detection means for detecting any vibration frequency change in the plate due to interaction between a stress field thereon caused by said seismic force and a stress field thereon caused by the said vibration mode.

2. A force sensor device according to claim 1, wherein the beams have a thickness which is less than that of the plate.

3. A force sensor device according to claim 2, wherein one face of each of said beams is flush with a face of said plate.

4. A force sensor device according to claim 1, wherein said beams have a midplane being off-set and parallel to a midplane of the plate.

5. A force sensor device according to claim 1, wherein said system springs are formed by two beams of identical geometry with parallel longitudinal axes, each beam suspending the plate at an angle of 90 degrees to a respective suspension side thereof and forming an angle of 90 degrees with a connecting side of the frame.

6. A force sensor device according to claim 5, wherein the plate has a substantially oblong form.

7. A force sensor device according to claim 5, wherein the plate has a substantially oblong hexagonal form.

8. A force sensor device according to claim 5, wherein a center line of the plate forms an angle in the range of 15–75 degrees with a beam longitudinal axis.

9. A force sensor device according to claim 8, wherein said angle is 45 degrees.

10. A force sensor device according to claim 5, wherein said beams are located at regions of the plate which have maximum distance apart.

11. A force sensor device according to claim 1, wherein the excitation means being of a thermal excitation resistor type located in at least one of the beams.

12. A force sensor device according to claim 12, wherein said detection means comprising one or more piezoresistive elements located in at least one of said beams.

13. A force sensor device according to claim 12, wherein said detection means has a plurality of piezoresistive elements forming a Wheatstone bridge structure.

14. A force sensor device according to claim 1, wherein the excitation means being of a piezoresistor type located in at least one of the beams.

15. A force sensor device according to claim 14, wherein said detection means comprising one or more piezoresistive elements located in at least one of said beams.

16. A force sensor device according to claim 15, wherein said detection means has a plurality of piezoresistive elements forming a Wheatstone bridge structure.

17. A force sensor device according to claim 1, wherein the excitation means being of a thermal excitation resistor type located in the plate.

18. A force sensor device according to claim 17, wherein said detection means comprising one or more piezoresistive elements located in at least one of said beams.

19. A force sensor device according to claim 18, wherein said detection means has a plurality of piezoresistive elements forming a Wheatstone bridge structure.

20. A force sensor device according to claim 17, wherein said detection means comprising one or more piezoresistive elements located in the plate.

21. A force sensor device according to claim 20, wherein said detection means has a plurality of piezoresistive elements forming a Wheatstone bridge structure.

22. A force sensor device according to claim 17, wherein said detection means comprising one or more piezoresistive elements located in the plate and at least one other of said beams.

23. A force sensor device according to claim 22, wherein said detection means has a plurality of piezoresistive elements forming a Wheatstone bridge structure.

24. A force sensor device according to claim 1, wherein the excitation means being of a piezoresistor type located in the plate.

25. A force sensor device according to claim 24, wherein said detection means comprising one or more piezoresistive elements located in at least one of said beams.

26. A force sensor device according to claim 25, wherein said detection means has a plurality of piezoresistive elements forming av Wheatstone bridge structure.

27. A force sensor device according to claim 1, wherein the excitation means being of a piezoresistor type located in the plate and at least one of the beams.

28. A force sensor device according to claim 27, wherein said detection means comprising one or more piezoresistive elements located in at least one of said beams.

29. A force sensor device according to claim 28, wherein said detection means has a plurality of piezoresistive elements forming a Wheatstone bridge structure.

30. A force sensor device according to claim 1, wherein the excitation means being of electrostatic type, wherein the detection means being capacitive type, wherein the plate is located in spaced apart relationship between said excitation means and said detection means, and wherein said plate electrically connects to a common electrical node of the excitation means and the detection means and forms a capacitor electrode element common to both said excitation means and said detection means.

31. A force sensor device according to claim 30, wherein the excitation means have electrodes facing one face of the plate to provide an electrostatic field varying according to an applied electrical signal of said specific frequency, and wherein the detection means have electrodes facing the other face of the plate to detect capacitance variation due to said stress field interaction.

32. A force sensor device according to claim 31, wherein the electrodes of the detection means are located on a lid covering said one face of the plate.

33. A force sensor device according to claim 30, wherein said excitation and detection means are located at regions midway between vibration nodes of the plate.

34. A force sensor device according to claim 1, wherein the excitation means being of electrostatic type, wherein the detection means being capacitive type, wherein the plate is located in spaced apart relationship with said excitation means and said detection means, and wherein said plate electrically connects to a common electrical node of the excitation means and the detection means and forms a capacitor electrode element common to both said excitation means and said detection means.

35. A force sensor device according to claim 34, wherein the excitation means have electrodes facing one face of the plate to provide an electrostatic field varying according to an applied electrical signal of said specific frequency, and wherein the detection means have at least one electrode facing said one face of the plate to detect capacitance variation due to said stress field interaction.

36. A force sensor device according to claim 35, wherein the electrodes of the excitation and detection means are located on a lid covering said one face of the plate.

37. A force sensor device according to claim 1, further comprising electronic circuitry having a first set of terminals connected to the excitation means to provide excitation signals thereto, and a second set of terminals connected to the detection means for receiving signals indicative of vibration frequency changes caused by said interaction of stress fields, means for monitoring an output signal from said detection means and threshold means initiating an operation signal to be delivered to a third set of terminals connected to peripheral equipment if a state of change in said output signal is above a specific threshold.

38. A force sensor device according to claim 37, wherein said peripheral equipment is a vehicle air bag inflating device.

39. A force sensor device according to claim 1, wherein the plate, the beams, the frame, the excitation means, the detection means and the electronic circuitry are located on a common silicon substrate.

40. A force sensor device according to claim 1, wherein said beams are located at regions of the plate which have maximum distance apart.

41. A force sensor device according to claim 1, wherein said excitation and detection means are located at regions midway between vibration nodes of the plate.

* * * * *

UNITED STATES PATENT AND TRADEMARK OFFICE
CERTIFICATE OF CORRECTION

PATENT NO. : 5,834,646
DATED : November 10, 1998
INVENTOR(S) : Terje KVISTERÖY et al.

It is certified that error appears in the above-identified patent and that said Letters Patent is hereby corrected as shown below:

In Column 4, line 48, change "Fig. 8 shows" to --Figs. 8, 8a and 8b show--

In Column 6, line 38, change "nicromachining" to --micromachining--

In Column 9, line 1, remove "30"

In Column 16, line 9, change "claim 12" to --claim 11--

Signed and Sealed this

Fifteenth Day of June, 1999

Attest:

Q. TODD DICKINSON

Attesting Officer

Acting Commissioner of Patents and Trademarks